(12) United States Patent
Bradenbaugh

(10) Patent No.: US 6,363,216 B1
(45) Date of Patent: Mar. 26, 2002

(54) WATER HEATER HAVING DUAL SIDE-BY-SIDE HEATING ELEMENTS

(76) Inventor: Kenneth A. Bradenbaugh, 10078 Candlestick La., Concord, OH (US) 44077

(*) Notice: Subject to any disclaimer, the term of this patent is extended or adjusted under 35 U.S.C. 154(b) by 0 days.

(21) Appl. No.: 09/753,154

(22) Filed: Jan. 2, 2001

Related U.S. Application Data

(63) Continuation-in-part of application No. 09/361,825, filed on Jul. 27, 1999.

(51) Int. Cl.[7] .............................. F24H 9/20; H05B 1/02
(52) U.S. Cl. ........................ 392/463; 392/454; 219/441
(58) Field of Search ................................ 392/441, 451, 392/450, 463; 219/494, 385, 441

(56) References Cited

U.S. PATENT DOCUMENTS 5,948,304 A * 9/1999 Bradenbaugh .............. 219/496

* cited by examiner

Primary Examiner—Tu Ba Hoang
Assistant Examiner—Thor Campbell
(74) Attorney, Agent, or Firm—Michael Best & Friedrich LLP

(57) ABSTRACT

A water heater having a water tank and multiple electric resistance heating elements extending into the water tank for heating water in the tank. The water heater includes a proportional band temperature controller for conducting electric power to the electric resistance heating elements in bursts. Each burst of electric power is followed by a period during which the temperature controller does not conduct power to the electric resistance heating element. In one embodiment, each burst of electrical power lasts for about 95% or less of a cycle comprised of one burst of electric power followed by the period during which the temperature controller does not conduct electric power. Further, activation of the heating elements by the controller is carried out in a sequential or other timed or controlled fashion to permit uniform heating of the water in the tank.

11 Claims, 19 Drawing Sheets

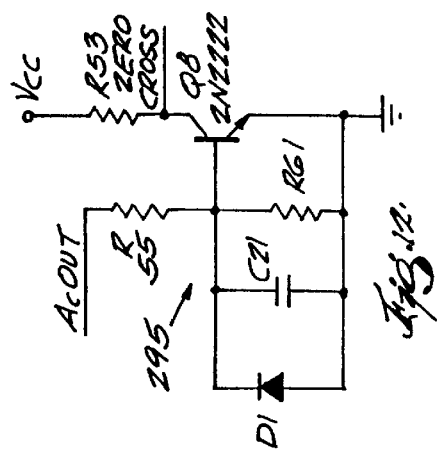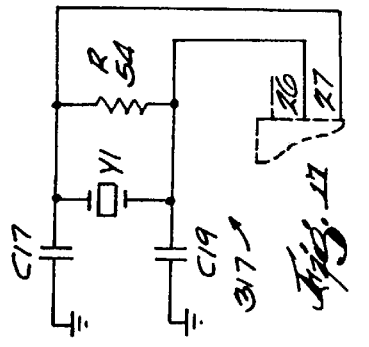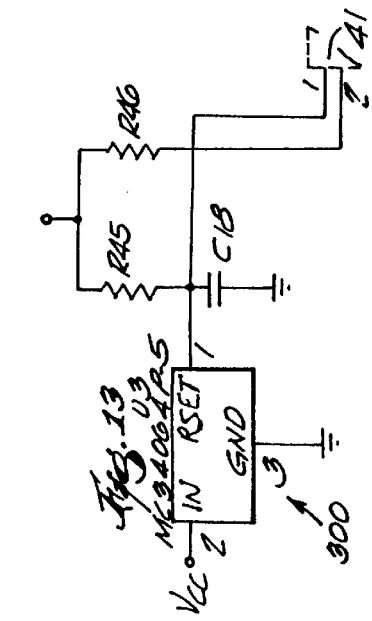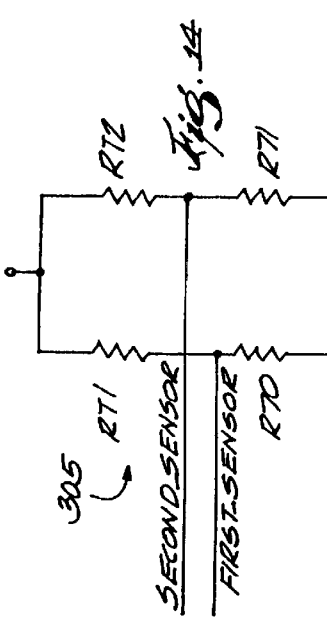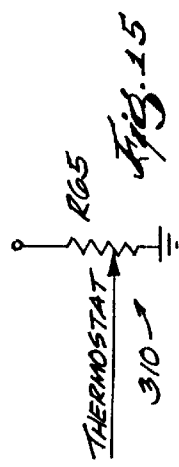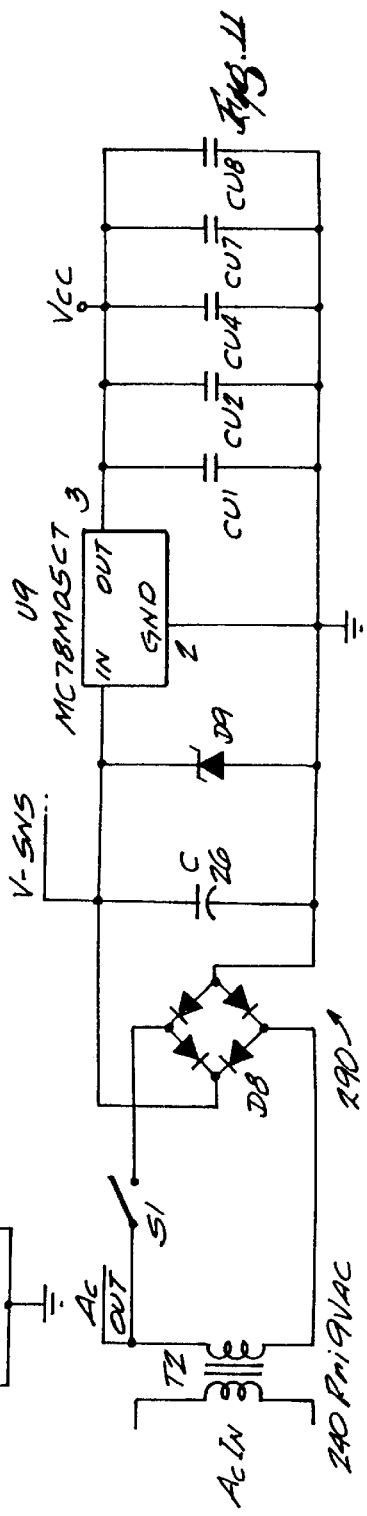

WATER HEATER HAVING DUAL SIDE-BY-SIDE HEATING ELEMENTS

RELATED APPLICATIONS

This is a continuation-in-part of U.S. Ser. No. 09/361,825, filed Jul. 27, 1999.

FIELD OF THE INVENTION

The present invention relates generally to electrical water heaters. More particularly, the invention relates to methods and apparatus for pulsing electrical power to electrical resistance heating elements in a manner to improve the heating efficiency of the water heater.

BACKGROUND OF THE INVENTION

A storage-type water heater typically comprises a permanently enclosed water tank, a cylindrical shell coaxial with and radially spaced apart from the water tank to form an annular space between the outer wall of the water tank and the inner wall of the shell, and insulating material in at least a portion of the annular space for providing thermal insulation to the water tank. The water tank has various appurtenances such as inlet, outlet and drain fittings. Additionally, the water heater is provided with a water heating and temperature control system. The water heating and temperature control system includes an electrical-resistance-heating element. The heating element extends through a fitting in the wall of the water tank such that the heating element is inside the tank. The heating element is connected to an electrical power source outside the water tank.

Conventional water heating and temperature control systems typically further include a mechanical thermostat. The mechanical thermostat closes a switch to allow electrical power through the electrical resistance heating element when water in the tank is sensed to be below a selected set point temperature, and opens the switch to stop electrical power from passing through the electrical resistance heating element when the water in the tank is at or above the set point temperature. Electrical power through the electrical resistance heating element is either fully on, passing full electrical current, or completely off. Due to variations in manufacture and hysteresis of the mechanical thermostat, the temperature of the water will "overshoot" the desired set-point temperature. In other words, the water heating and temperature control system allows the electrical resistance heating element to continue heating water in the water tank even when the water temperature is above the set point temperature. It would be beneficial to prevent or limit the amount of overshoot of the conventional water heater.

SUMMARY OF THE INVENTION

Accordingly, the invention provides a water heater having a controller for modulating electric power to an electrical-resistance-heating element in short pulses or bursts. Providing electric power to the heating element in short pulses or bursts allows an equal amount of water to be heated to a selected temperature at substantially the same rate as with a mechanical temperature controller of the prior art, yet uses substantially less electric power to heat the water. Therefore, modulating the electric power improves the efficiency of the water heater.

According to another aspect of the present invention, an even greater water heater efficiency occurs if the water heater includes multiple, controlled heating elements. If multiple heating elements are used, it is preferable that the controller activates the elements sequentially or at some predetermined frequency or in some predetermined fashion so that heat energy being transferred to the tank is distributed in a balanced or uniform manner. Even further, placing or mounting the heating elements in an approximately lower one-third volume of the heater tank enhances the energy saving performance of the water heater. Mounting the multiple heating elements in the lower one-third volume of the tank increases the radiation field of the heating elements, and results in a spreading of the wattage over a larger area. This results in an increased flow rate pattern of convection currents in the water, and helps to heat the water more uniformly.

The invention further provides a water heater including a tank for holding water, a water inlet line having an inlet opening that introduces cold water to the tank, a water outlet line having an outlet opening that withdraws heated water from the tank, a first heating element extending into the tank, and a second heating element extending into the tank. The water heater includes a control circuit operable to control the supply of electric power to the first and second heating elements in bursts, respectively. Each burst is followed by a period during which electric power is not supplied to the heating elements thereby improving the efficiency of the water heater. The control circuit is further operable to activate the first burst for a first period of time and to activate the second burst for a second period of time.

Other features and advantages of the invention will become apparent to those skilled in the art upon review of the following detailed description, claims and drawings.

BRIEF DESCRIPTION OF THE DRAWINGS

FIG. 11 is an electrical schematic of a power supply for the control circuit shown in FIG. 10.

FIG. 12 is an electrical schematic of a zero crossing detector of the control circuit shown in FIG. 10.

FIG. 13 is an electrical schematic of a low-voltage reset circuit of the control circuit shown in FIG. 10.

FIG. 14 is an electrical schematic of a temperature sensing circuit of the control circuit shown in FIG. 10.

FIG. 15 is an electrical schematic of a thermostat of the control circuit shown in FIG. 10.

FIG. 17 is an electrical schematic of an oscillator for the control circuit shown in FIG. 10.

Figure 1:
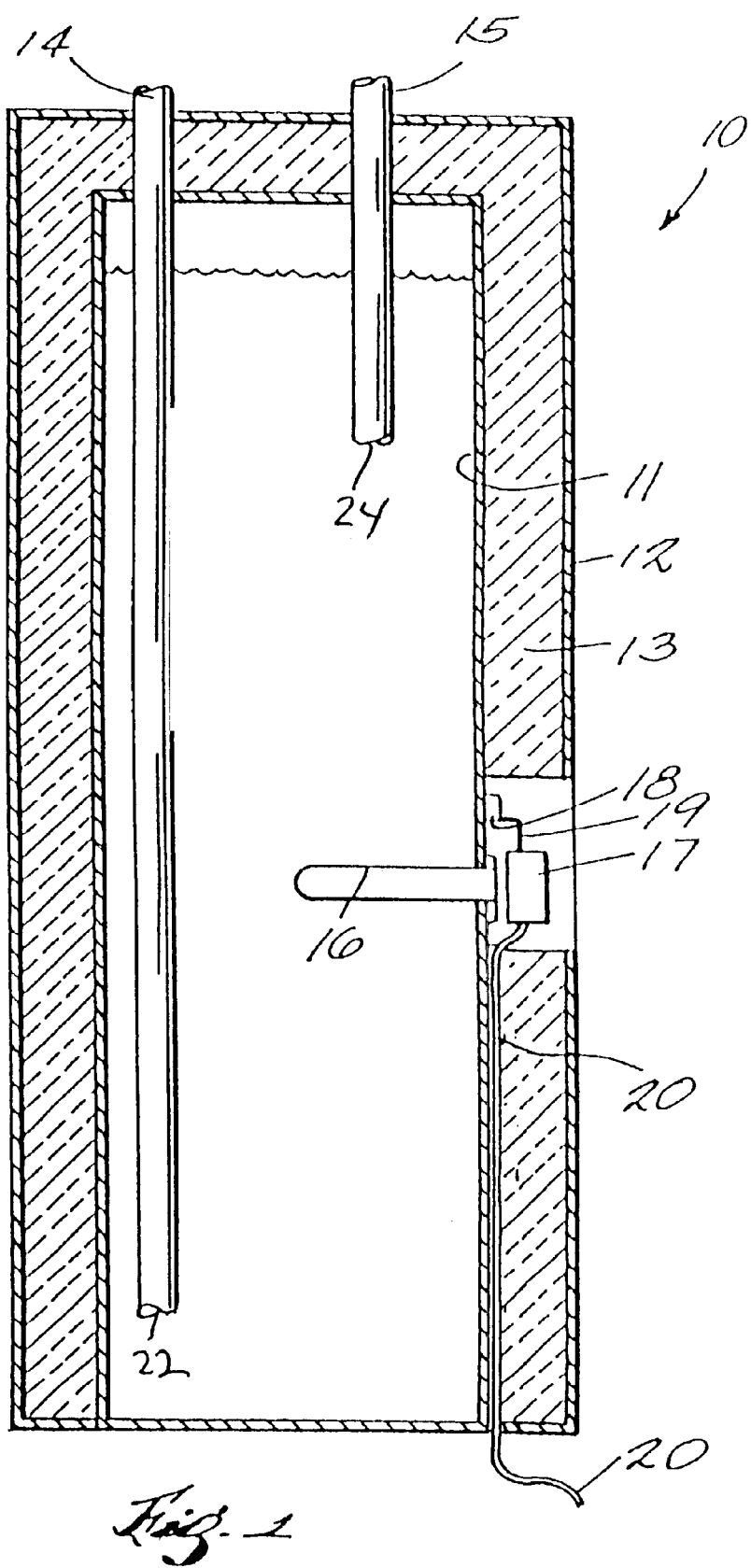
FIG. 1 is a sectional view of a water heater embodying the invention, and showing the arrangement of the temperature controller of the present invention in relation to other components of the water heater.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter.

DETAILED DESCRIPTION OF THE PREFERRED EMBODIMENT

As described above, the use of a proportional band temperature controller in a water heater having an electrical resistance heating element has the unexpected advantage of heating water in the water heater to a preselected set point temperature while consuming less electric power than is consumed when heating the same amount of water to the same set point temperature in the same water heater using a mechanical temperature controller of the prior art.

An exemplary proportional band temperature controller is an electronic device which comprises a water temperature sensing device (thermistor), a temperature set point device (variable rheostat), a gated thyristor for switching electric power to the resistance heating element, and a logic circuit for controlling the thyristor in response to signals from the water temperature sensing device and the temperature set point device. The logic circuit receives a voltage input from the water temperature sensing device and the temperature set point device which indicates the differential of the water temperature from the set point temperature. The logic circuit, in response to the voltage inputs from the water temperature sensing device and the temperature set point device, signals the gated thyristor. At large temperature differentials between the water temperature sensing device and the temperature set point device, the logic circuit signals the gated thyristor to conduct electricity during a major portion, about 94%, of each cycle of the AC current, and signals the gated thyristor to stop conducting electricity for about 6% of each AC cycle. As the temperature differential between the water and the set point narrows, the water temperature enters a proportional control band where the logic circuit begins to exert more control over the gated thyristor to limit electric power to the resistance heating element. As the water temperature enters the proportional control band, the logic circuit establishes a new control cycle period and signals the thyristor to conduct electric power for 85% of each cycle and to stop conducting for 15% of each cycle. As the water temperature gets closer to the set point temperature the logic circuit signals the thyristor to conduct for less of each cycle period. When the water temperature reaches the set point temperature, the logic circuit closes the thyristor and electric power is not supplied to the resistance heating element until the water temperature again falls below the set point temperature. To prevent undue cycling about the set point temperature, the logic circuit is set to require the water temperature to drop 50° to 10° F. below the set point temperature before the thyristor is again signaled to conduct electric power and heat the water back to the set point temperature.

This improvement in the efficiency of heating water in the water heater using a proportional band temperature controller is not completely understood. In theory, essentially all the electrical power supplied to a resistance heating element will be converted to heat, and that heat should be transferred to the water surrounding the resistance heating element. The same amount of electric power should heat the same weight of water the same number of degrees temperature. As shown in the example below, a water heater having a proportional band temperature controller requires about 10% less electrical power to heat a tank of water to a selected set point temperature than the same water heater having a mechanical temperature controller of the prior art. The improved accuracy of a proportional band temperature controller for bringing water to a set point temperature with little overshoot accounts for some of the improved efficiency over a mechanical temperature controller, but does not appear to account for all.

While not wishing to be bound to the following statements, I suggest that the improvement in heating efficiency when using a proportional band temperature controller arises from physical conditions within the water tank affecting the transfer of heat from the resistance heating element to the water. A proportional band temperature controller conducts electric power to the resistance heating element in short bursts followed by short periods during which electric power is not conducted until the water in the water tank reaches a selected set point temperature. The proportional band temperature controller accurately stops conducting electric power to the resistance heating element when the water reaches the set point temperature. On the other hand, a mechanical temperature controller of the prior art conducts electric power to the resistance heating element continuously at full power as the water is heating. When the water reaches the set point temperature mechanical characteristics of the bimetallic thermocouple may cause the mechanical temperature controller to overshoot and heat the water to a temperature above the set point temperature before it stops conducting electric power to the resistance heating element.

A resistance heating element, as is used in domestic water heaters, heats in a few seconds to a temperature in the range of 800° F. to 900° F. Water, in contact with such a hot resistance heating element, may vaporize depending on tank pressure, may form a layer of vapor around the resistance heating element and reduce the transfer of heat from the resistance heating element to the water. With a mechanical temperature controller, the resistance heating element is so heated and remains at a high temperature until the bimetallic thermocouple cuts off electric power. Heat from a resistance heating element controlled by a mechanical temperature controller may be radiated to the wall of the water tank, or may be transported by vaporization convection currents to the top of the water tank where the excess heat is absorbed in the topmost layer of water which is located away from the temperature sensing bimetallic thermocouple.

With a proportional band temperature controller, the resistance heating element is heated during each burst of electric power and is cooled by contact with the water during periods between bursts. This cooling of the resistance heating element between each burst of electric power reduces the temperature to which the resistance heating element is raised and reduces the potential for accumulation of vaporization around the hot resistance heating element. Consequently, heat transfer from the resistance heating element to the water is increased. Supplying electric power to a resistance heating element in a water heater in discrete short bursts, each burst followed by a period with the electric power shut off, improves the efficiency of heat transfer from the resistance heating element to the water in the water heater.

Proportional band temperature controllers are well known and widely used in many commercial applications, including to control water temperature in such appliances as coffee makers. Proportional band temperature controllers have not, to my knowledge, been used to control the temperature of a large volume of water in a storage water heater.

FIG. 1 of the drawing shows a sectional view of a water heater 10 comprising a permanently enclosed water tank 11, a shell 12 surrounding water tank 11, and foam insulation 13 filling the annular space between water tank 11 and shell 12. Water inlet line or dip tube 14 and water outlet line 15 enter the top of water tank 11. The water inlet line 14 has an inlet opening 22 for adding cold water near the bottom of water tank 11. Water outlet line 15 has an outlet opening 24 for withdrawing hot water from near the top of water tank 11. Resistance heating element 16 extends through the wall of water tank 11. The proportional band control circuitry in control box 17 is connected to resistance heating element 16. Thermistor 18, in contact with the outer wall of water tank 11 for sensing the temperature of water in water tank 11, is connected to the logic circuit by electrical wire 19. Electric A.C. power is supplied to the gated thyristor through line 20. A customizable operator interface may be mounted on the outside of the water heater to permit communication with the control box 17 and provides security protected access for control of the heating element. The operator interface may be operable to provide direct or remote control of the heating element.

Figure 2:
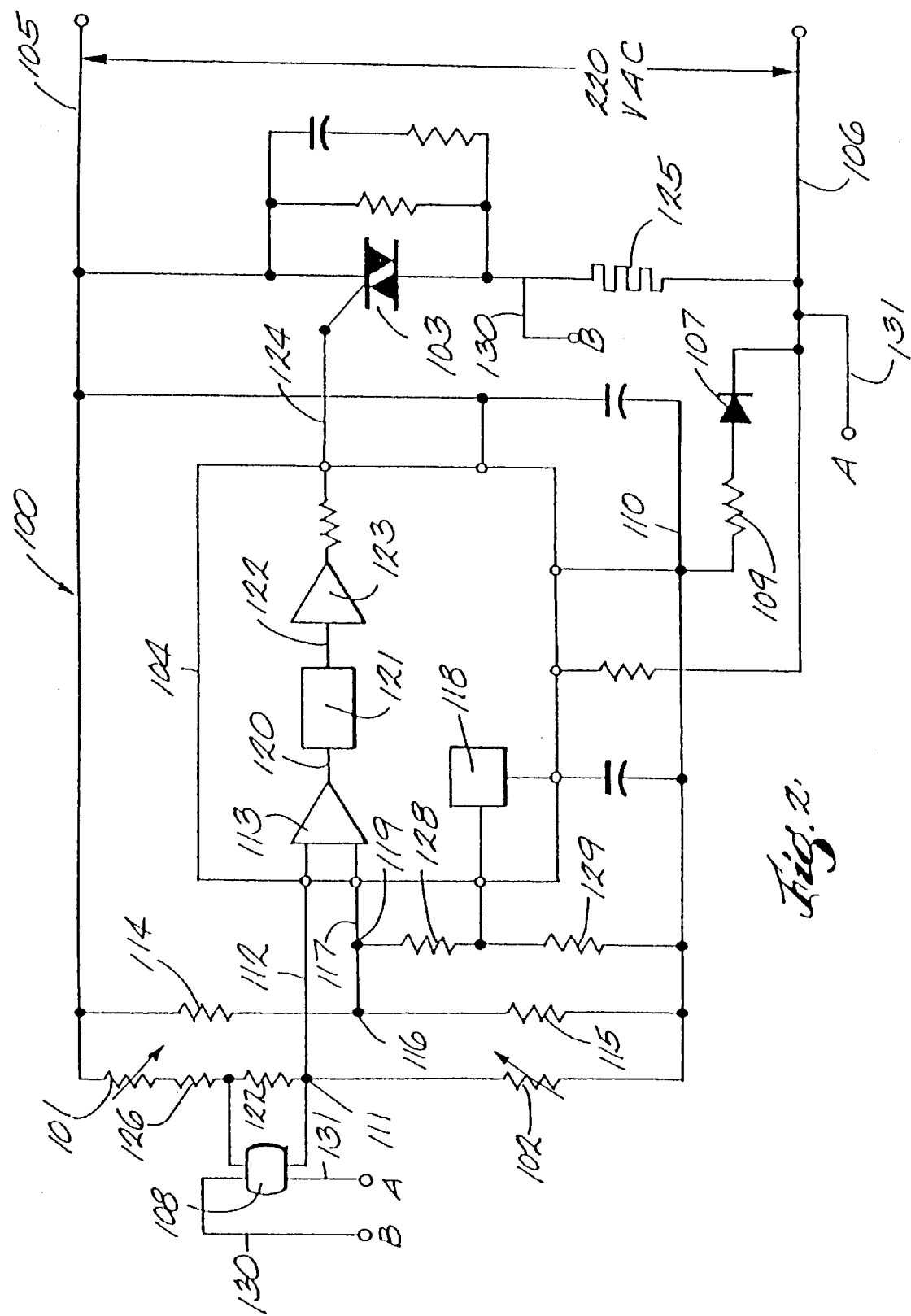
FIG. 2 is an electrical schematic of a temperature controller embodying the present invention.

FIG. 2 of the drawings is a schematic drawing of a preferred proportional band temperature control circuit 100 for heating water in a water heater according to the method of the present invention. In FIG. 2, resistance heating element 125 is a 4,500 watt heating element for heating water in a water heater. Temperature set point device 101 is a variable rheostat for setting the temperature set point in the range of about 90° F. to 180° F. Thermistor 102 is for sensing temperature of water in the water heater. In an alternative embodiment, a plurality of thermistors could be placed through the tank to measure water temperature at a plurality of locations. The output of the thermistors could be averaged.

Gated thyristor 103 is a TRIAC, manufactured by Motorola, Inc., for controlling electric power to resistance heating element 125. Logic chip 104 is a proportional band temperature controller UAA1016A manufactured by Motorola, Inc. Two hundred forty volt electric power is supplied to the proportional band temperature control circuit 100 through lines 105 and 106. Opto-electric coupler 108, as will be described below, is for controlling the amount the water temperature must decrease from the set point temperature before the proportional band temperature control circuit will reactivate.

A stabilized supply voltage of about −8 Volts is delivered to the proportional band temperature control circuit from line 106 through Zener diode 107 and resistor 109 into line 110. Voltage drops through temperature set point device 101 and temperature sensor 102 produce a signal voltage at point 111. The signal voltage is proportional to the temperature difference between the set point temperature and the sensed water temperature. The sensed voltage is transmitted via line 112 to one leg of a voltage comparator 113 within logic chip 104. A reference voltage, the magnitude of which is determined by voltage drops through resistors 114 and 115, is generated at point 116. A saw tooth voltage, generated in saw tooth generator 118 in logic chip 104, is imposed upon the reference voltage at point 119. The reference voltage, modified by the saw tooth voltage passes via line 117 to the second leg of voltage comparator 113.

The saw tooth voltage imposed upon the reference voltage causes the voltage at the second leg of voltage comparator 113 to vary, in a saw tooth pattern, over a cycle of about 0.85 seconds from a minimum to a maximum voltage. In voltage comparator 113, the signal voltage at the first leg is compared to the modified reference voltage at the second leg. The comparison result is transmitted via line 120 to logic circuit 121. In logic circuit 121, a signal is generated for passing via line 122, amplifier 123 and line 124 for controlling thyristor 103. When the signal voltage at the first leg of comparator 113 is greater than the maximum value of the reference voltage at the second leg of comparator 113, the signal to thyristor 103 is to conduct and allow electric power to flow through resistance heating element 125 for heating water in the water tank. Logic chip 104 is arranged such that the signal in line 124 causes thyristor 103 to conduct electricity for 96% of each AC current cycle and stop conducting for 4% of each current cycle.

The signal voltage at the first leg of voltage comparator 113 will fall to a value less than the maximum value of the reference voltage at the second leg of voltage comparator 113 as the water temperature sensed by temperature sensor 102 approaches the set point temperature selected on set point temperature device 101. When the signal voltage is in the range between the maximum value of the reference voltage and the average of the reference voltage value, the temperature control circuit 100 is within the proportional band control range. Thus, when the signal voltage is greater than the value of the reference voltage at the second leg of the voltage comparator, logic circuit 121 signals amplifier 123 to signal thyristor 103 to conduct electric power to resistance heating element 125. Then, as the saw tooth voltage causes the reference voltage at the second leg of voltage comparator to increase to a value greater than the value of the signal voltage at the first leg of the voltage comparator, logic circuit 121 signals amplifier 123 to signal thyristor 103 to stop conducting electric power to resistance heating element 125. As the signal voltage at the first leg of voltage comparator approaches closer to the average value of the reference voltage at the second leg of voltage comparator 113, thyristor 103 is not conducting for greater percentages of each cycle of the generated saw tooth voltage. When the water temperature sensed by temperature sensor 102 is equal to the set point temperature of temperature set point device 101 the signal voltage at the first leg of voltage comparator 113 will equal the average reference voltage value at the second leg of voltage comparator 113 and logic circuit 121 signals amplifier 123 to turn off thyristor 103, shutting off electric power to resistance heating element 125. Thyristor 103 remains in the nonconducting state until the water temperature sensed by temperature sensor 102 falls below the set point temperature by a preset amount, as is described below.

The signal voltage at the first leg of voltage comparator 113 and the reference voltage at the second leg of voltage comparator 113 must have values which allow logic circuit 121 to produce a signal to amplifier 123 which will properly control thyristor 103 to heat the water to the desired temperature. Temperature set point device 101 is a variable rheostat the resistance of which may be adjusted manually for changing the set point temperature. Temperature sensor 102 is a thermistor in which the resistance decreases as the sensed temperature of the water increases. The values of resistors 126 and 127 are selected such that the signal voltage at point 111 will be proportional to the difference between the set point temperature and the sensed water temperature. The reference voltage at point 116 is determined by the value of resistors 114 and 115, and the magnitude of the saw tooth voltage imposed upon the reference voltage at point 119 is determined by the values of resistors 128 and 129. The values for these resistors must be adjusted to accommodate the characteristics of the particular temperature set point device 101, temperature sensor 102 and logic chip 104 selected for the proportional band temperature control circuit 100.

As described above, opto-electric coupler 108 is included in proportional band temperature control circuit 100 to prevent undue cycling of thyristor 103 when the sensed water temperature is at about the set point temperature. When the sensed water temperature equals the set point temperature, logic circuit 121 signals amplifier 123 to cut off thyristor 103 and stop conduction of electric power to resistance heating element 125. Without opto-coupler 108, when the sensed water temperature drops a small amount, for example, less than 1° C., below the set point temperature, logic circuit 121 will signal amplifier 123 to open thyristor 103 and conduct electric power to resistance heating element 125 until the sensed water temperature is again heated to the set point temperature. This action results in rapidly turning thyristor 103 off and on, to control the sensed water temperature as closely as possible to the set point temperature.

Opto-electric coupler 108, connected electrically across resistance heating element 125 by lines 130 and 131, operates to make the sensed temperature appear to be about 5° C. higher than it actually is when electric current is flowing through resistance heating element 125. So, when the water temperature sensed by temperature sensor 102 reaches the set point temperature, thyristor 103 is stopped from conducting electric current through resistance heating element 125 and opto-electric coupler 108. With no current flowing through opto-electric coupler 108, the signal voltage at point 111 is determined by voltage drop through temperature sensor 102 and voltage drop through set point device 101, resistor 126, and resistor 127. Resistor 127 produces a voltage drop equivalent to the voltage drop caused by about a 5° C. temperature change in the sensed temperature. Consequently, the sensed temperature appears to be about 5° C. higher than it actually is, and the sensed temperature must drop an additional 5° C. before the signal voltage at the first leg of voltage comparator 113 will indicate that the sensed temperature is below the set point temperature. When voltage comparator 113 signals logic circuit 121 that the sensed temperature is below the set point temperature, logic circuit 121 signals amplifier 123 to open thyristor 103 and allow electric current to flow through resistance heating element 125. With electric current flowing through resistance heating element 125, electric current flows through opto-electric coupler 108 via lines 130 and 131. With electric current flowing through opto-electric coupler 108, resistor 127 is bypassed and the 5° C. bias to the apparent sensed water temperature is removed. Logic circuit 121 then signals amplifier 123 to open thyristor 103 until the sensed water temperature again reaches the set point temperature. This action of opto-electric coupler 108 allows the sensed temperature to fall about 5° C. below the set point temperature before thyristor 103 again conducts electric power through resistance heating element 125, and allows the sensed water temperature to be heated to the set point temperature before electric power is cut off from resistance heating element 125. This action prevents cycling of electric current through resistance heating element 125 when the sensed water temperature is at about the set point temperature.

In an alternative embodiment, the temperature control circuit 100 could include a programmable real time clock wherein peak or off-peak energy demand periods or vacation operation cycles could be programmed into the control cycle for the heating element. Additionally, a pressure sensor, temperature sensor, mineral deposit sensor and/or sensor for detecting the presence of water could be added. The control circuit would be programmed to disconnect power from the water heater and/or the heating element when predetermined conditions or limits are detected. Further, the control circuit could include means for automatically adjusting the set point in response to various conditions such as amount of water used, or whether it is a peak or off-peak energy demand period.

EXAMPLE

In a first example, an electric water heater having a 4,500 Watt resistance heating element was operated for heating water from 60° F. to 120° F. using 240 Volt AC current. In a first run, a commercially available bimetallic thermostat, as described in the introduction to this application, was used to sense the water temperature and control electric current to the resistance heating element. In a second run, the proportional band temperature control circuit, as shown in FIG. 2 and described in this application, was used to sense the water temperature and control flow of electric current to the resistance heating element. Results of the two comparative runs are shown in FIG. 3 of the drawings.

For Run 1, tension on a bimetallic thermostat was adjusted with a threaded stud such that the bimetallic thermostat would snap from a flat configuration to a domed configuration at a set point temperature of 120° F. The bimetallic thermostat was placed in contact with the outer wall of the water heater water tank at a position about three inches above the electric resistance heating element. The bimetallic thermostat was connected, via an insulating rod, to an electric switch in a line supplying electric power to the resistance heating element. The water tank was filled with 60° F. water and the electric power connected to the line supplying the resistance heating element. The bimetallic thermostat remained in a flat position and the electric switch was closed. Electric current passed through the resistance heating element at a rate of 19.7 amperes for about 27 minutes until the water was heated to about 122° F. The bimetallic thermostat then snapped into a domed shape, activating the switch to cut off electric current to the resistance heating element. A graph of water temperature versus time for this first run is shown in FIG. 3.

For Run 2, a proportional band temperature control circuit, as shown in FIG. 2 and described above in this application, was used. The temperature set point device 101 was calibrated for a set point of 120° F., and the thermistor temperature sensing device 102 was attached to the water tank about three inches above the resistance heating element 125. Thyristor 103 was connected to resistance heating element 125. The water tank of the water heater was drained and refilled with 60° F. water and the proportional band temperature control circuit 100 was connected to the electric power main. The proportional band temperature control circuit 100 initially supplied 18.8 amperes of electricity to the resistance heating element 125, i.e. about 95% of the amperes supplied by the mechanical thermostat of Run 1. After about four minutes (at 68° F.), the proportional band temperature control circuit 100 reduced the electricity supplied to resistance heating element 125 to 18.6 amperes, i.e. about 91% of the amperes supplied by the mechanical thermostat of Run 1. After about 21 minutes (at 104° F.), the sensed water temperature entered the proportional band temperature range and the proportional band temperature control circuit 100 began to slowly reduce electric current to resistance heating element 125, until after 27 minutes the sensed water temperature reached the set point temperature and the proportional band temperature circuit 100 shut off electric current to the resistance heating element 125.

Figure 3:
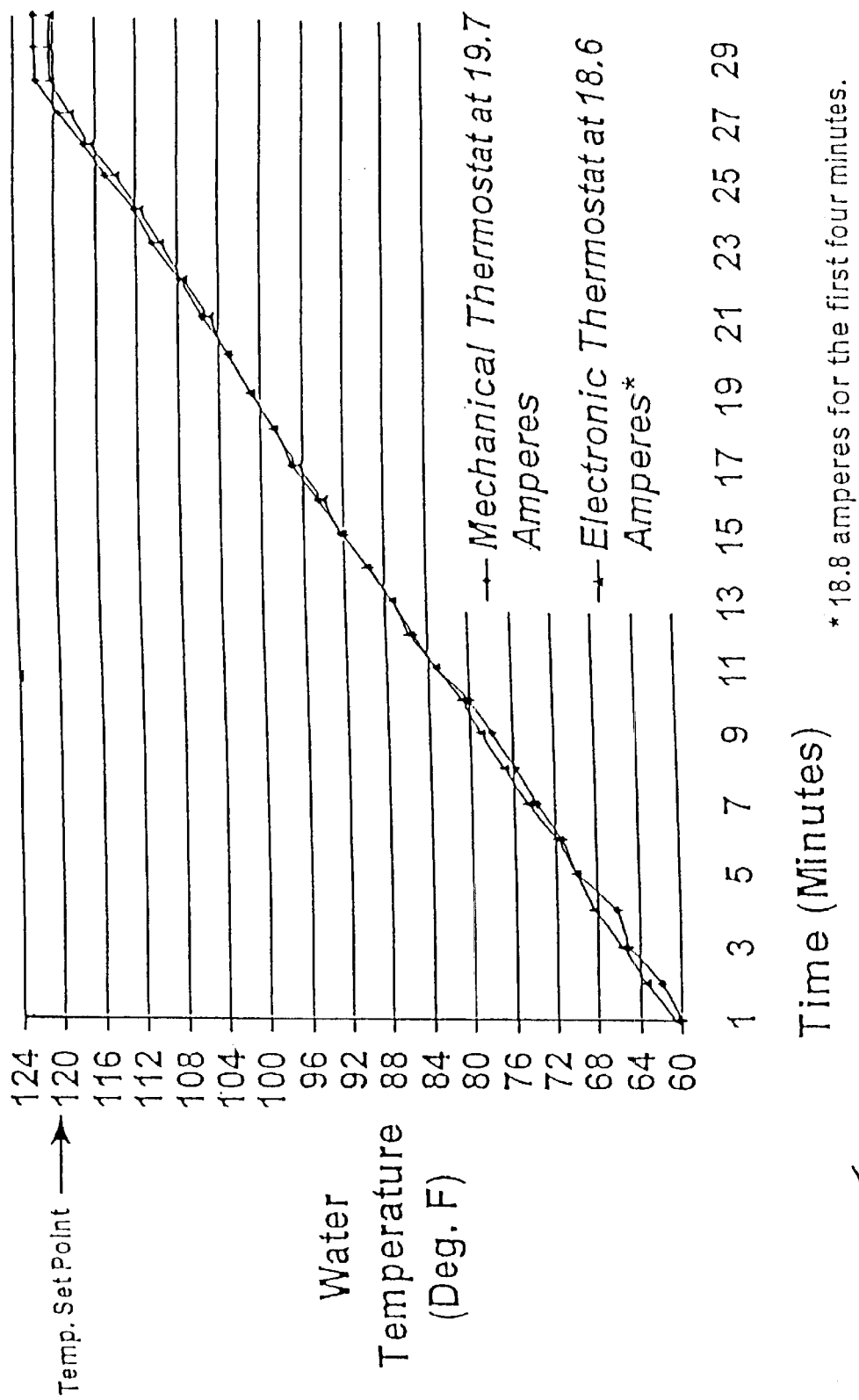
FIG. 3 is a plot of energy usage data of a mechanical temperature controller of the prior art and a proportional band temperature controller of the present invention.

Inspection of FIG. 3 shows that the same amount of water was heated to substantially the same temperature in the same amount of time in Run 1 and Run 2. However, in Run 1, 19.7 amperes of electricity were required and in Run 2, only about 18.6 amperes of electricity were required over the heating period. That is, heating water in a water heater equipped with the proportional band temperature control circuit of the present invention, which supplies electricity to the resistance heating element 125 in short bursts followed by short periods with electricity shut off, requires about 9% less electric power than heating the same amount of water to the same temperature in the same water heater, but using a mechanical temperature controller. This is an unexpected result.

The pulsing of current to the load by the proportional band temperature control circuit permits the water temperature to minutely rise and fall rapidly in response to the applied current. A brief interruption of current applied to the heater element each cycle allows for a more efficient transfer of radiation energy to the water from the heater element.

Figure 4:
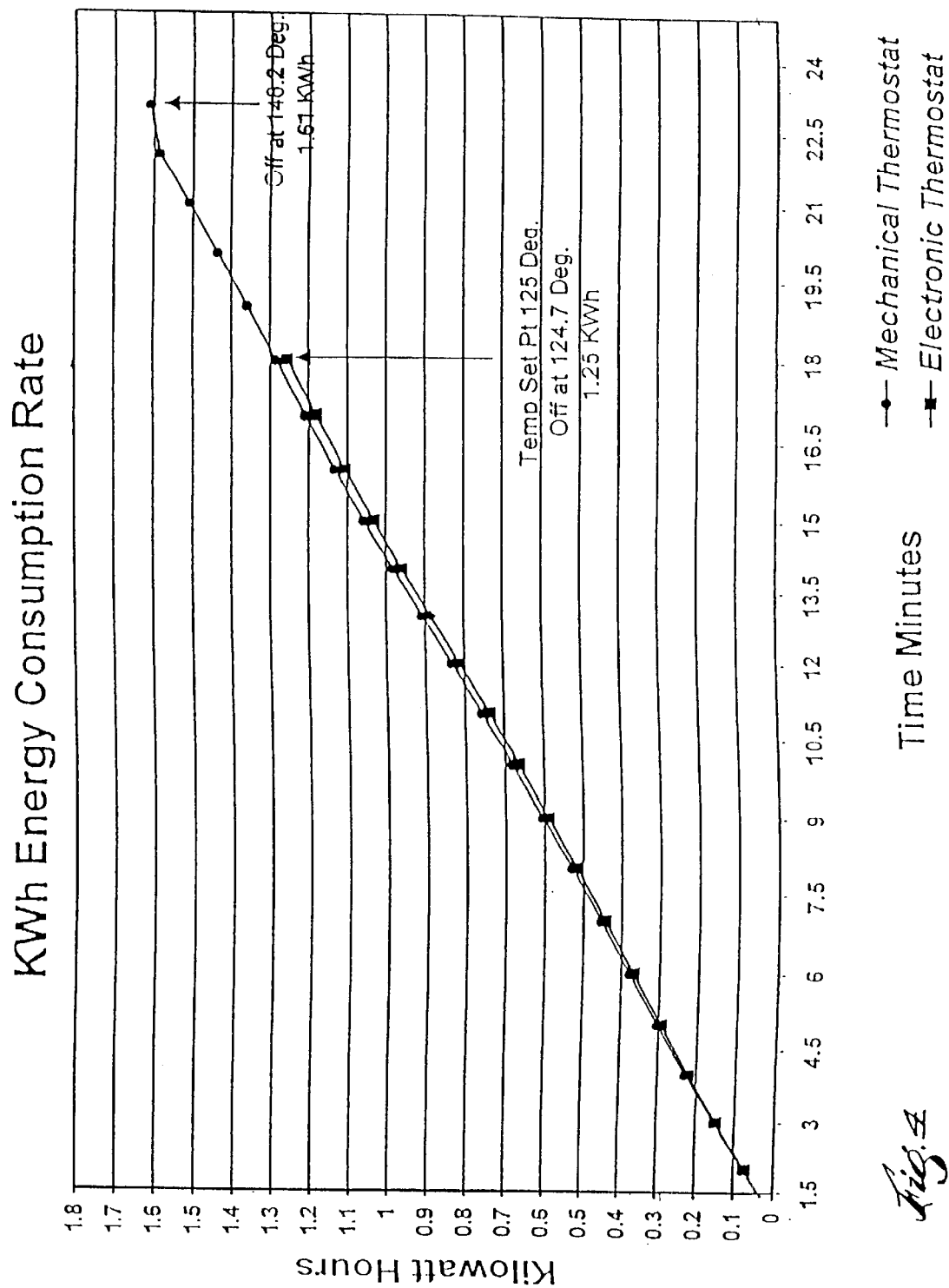
FIG. 4 is a plot of energy consumption rate data of the mechanical temperature controller of the prior art and the proportional band temperature controller of the present invention.

As a second example, a test was performed to determine the actual amount of energy a consumer would use during a typical hot water heater operating cycle. Referring to FIG. 4, the actual kilowatt hours (kWh) is plotted versus time for a mechanical thermostat and an electronic thermostat including proportional band control logic.

FIG. 4 illustrates that during a typical heating cycle, approximately 3% less energy is being used as a direct result of using the proportional band control logic. It is possible that this percentage could be increased to approximately 5–5.5% by changing the conduction angle of the triac's firing quadrants, without adversely affecting the performance of the water heater.

Additionally, by limiting the current to the heater element using proportional band control logic and by supplying the current to the heater in pulses, gradually coasting to the temperature set point without overshooting the desired temperature offers an additional 15% energy reduction.

The combination of current modulation and preventing the overshooting of the temperature set points offers the consumer a combined energy savings of nearly 10% over the cost of operation of a similar heater using a bimetal mechanical thermostat.

Overheating water past a reasonable temperature of 125° F.–130° F. generally wastes energy. A typical two inch thick layer of insulation loses its capacity to effectively retain heat at temperatures above 130° F. or so. This energy loss in standby mode is wasteful and potentially causes the heater to cycle more often than necessary.

The proportional band control circuit of the present invention prevents overshooting and allows the water temperature to drop only 10° F. or so to cycle only the needed difference to return the water temperature to a desired setpoint.

An additional advantage to the proportional band control circuit is its suitability for a flammable vapor environment. For example, such an environment may exist in a garage, workshop, or basement storage area wherein solvents, gasoline, propane or other highly flammable or explosive vapors are present. Mechanical thermostats and contact type switching devices can arc when an electrical contact is made or broken, depending on the amount of current being switched. The electrical arc can ignite a flammable vapor if the vapor is sufficiently volatile. In contrast, the proportional band control circuit is totally solid state, has no moving parts, and would not ignite flammable vapors.

Figure 5:
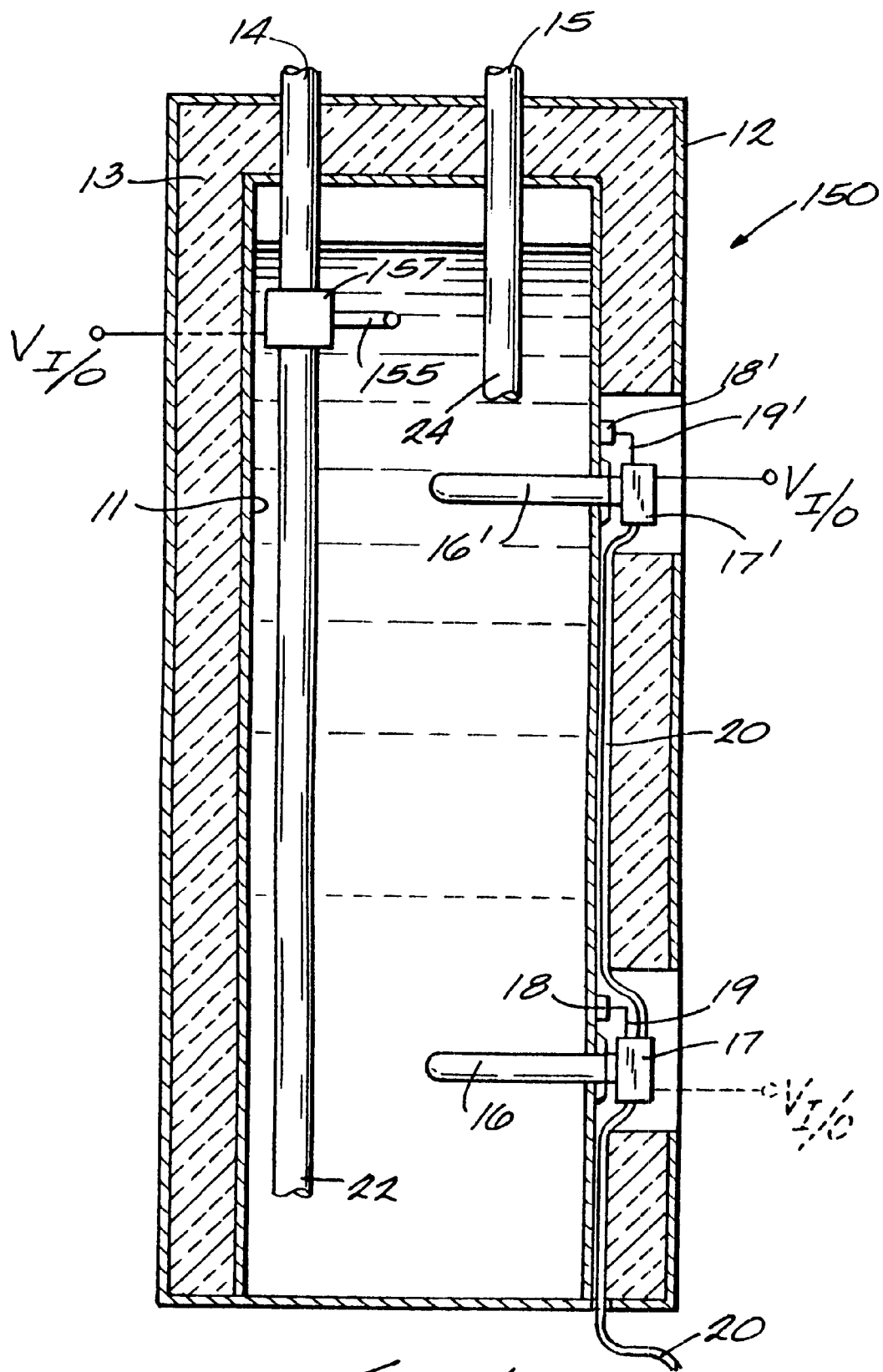
FIG. 5 is a sectional view of another water heater embodying the invention and having multiple heating elements.

While implementing proportional band control as described above is advantageous, even greater heating efficiency can be achieved in a water heater with multiple, controlled heating elements. An exemplary water heater 150 with such elements is shown in FIG. 5, and is the subject of U.S. Pat. No. 09/361,825, entitled PROPORTIONAL BAND TEMPERATURE CONTROL FOR MULTIPLE HEATING ELEMENTS, filed Aug. 17, 1999, which is incorporated herein by reference. The water heater 150 shares many common elements with the water heater 10, and common elements are designated with the same reference numerals in FIGS. 1 and 5. However, unlike the water heater 10, the water heater 150 has multiple heating elements 16 and 16'. Heating element 16 is located in the lower portion of the tank and heating element 16' is located in the upper portion of the tank. The heating element 16' may be controlled by control circuitry stored in a control box 17' which receives input from a thermistor or temperature sensor 18' through a communication link 19', such as an electrical wire. Alternatively, although not shown, the sensor 18' and heating element 16' could communicate with control circuitry stored in the control box 17 and just one controller rather than multiple circuits could be employed. Communication between the sensor 18' and heating element 16' could be accomplished through a communication link (not shown) running physically parallel to line 20. In the case of controlling two heating elements with a single controller, the control circuitry in box 17 might take the form of a programmable microprocessor. Of course, more than two heating elements could be installed in the water heater 150 and controlled by such a controller, if desired.

Regardless of the exact control circuitry used, or whether a single controller or multiple controllers are implemented, the heating elements in FIG. 5 are activated sequentially or at some predetermined frequency or fashion so that heat energy being transferred to the tank 150 is distributed in a balanced or uniform manner. Thus, for example, the heating element 16 might be active for a first period of time T1 during which power is supplied to it in the pulsed or multiple-burst manner described above. Subsequently, the element 16' might be activated in a pulsed manner for a period of time T2. Times T1 and T2 may or may not be of equivalent lengths, and may or may not overlap one another depending on the specific heating application and conditions. Moreover, feedback mechanisms employing the temperature sensors 18 and 18' may be used to trigger activation of the specific heating elements depending upon the temperature sensed in the upper and lower portions of the tank 11.

Whatever specific sequencing is employed, the use of a proportional band temperature controller to control multiple elements in a water heater helps to avoid uneven heating of the water in the tank. Uneven heating generally occurs in conventional heating systems where the bulk of water heating is accomplished with a heating element positioned near the bottom of the heater tank. This configuration often results in the creation of "stacking," where water that is heated rises to the top of the tank and becomes super-heated, while non-uniform temperature strata are formed in the lower portion of the tank. To make matters worse, the heat accumulation at the top of the tank tends to rapidly dissipate because the insulation 13 in the tank cannot effectively retain the high energy heat from the super heated water. With sequential pulse or burst heating of water as described herein, water in the tank 11 is more uniformly heated. This reduces the occurrence of hot or cold spots in the strata from the top to the bottom of the tank. The creation of super heated water is also reduced and efficiency is increased.

The sequencing described above may also be combined with controlled introduction of cold water through an outlet or conduit 155 of a mixing valve 157 positioned in the dip tube 14. The valve 157 may be controlled through a communication link $V_{I/O}$ coupled to the control circuitry in box 17' or, alternatively (and not shown), the circuitry in box 17 when it is configured to control multiple heating elements. Thus, for example, if super heating is sensed by the sensor 18' in the upper portion of the tank, an amount of cold water may be introduced into the top portion of the tank 11 through the outlet 155 to lower the temperature of the heated water.

Figure 6:
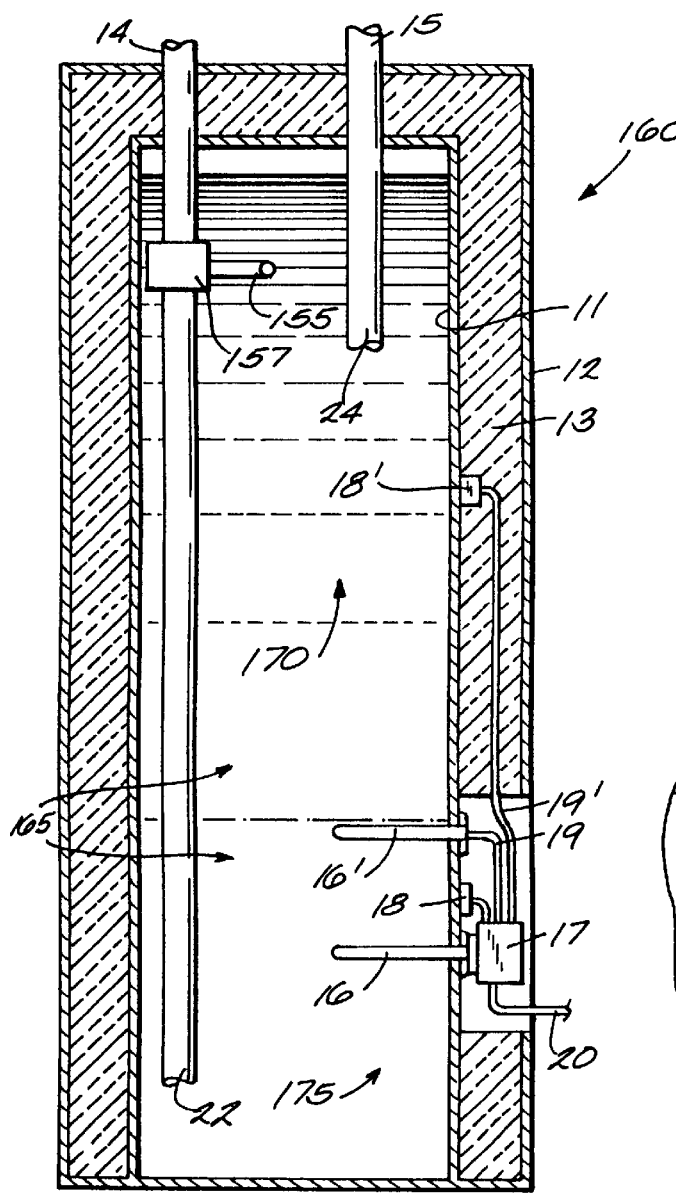
FIG. 6 is a sectional view of yet another water heater embodying the invention and having multiple heating elements.

Yet another water heater 160 embodying the invention is shown in FIG. 6. The water heater 160 shares many common elements with the water heaters 10 and 150, and common elements are designated with the same reference numerals in FIGS. 1, 5 and 6. For the embodiment shown in FIG. 6, the water tank 160 defines a volume 165 having an approximately upper two-thirds volume 170 and an approximately lower one-third volume 175. The inlet opening 22 is disposed in the lower one-third volume 175 and introduces cold water into the tank 11. The outlet opening 24 is disposed within the upper two-thirds volume 170.

As shown in FIG. 6, both heating elements 16 and 16' extend into the lower one-third volume 175 of the tank 11. The heating elements 16 and 16' are controlled by control circuitry stored in control box 17 which receives input from temperature sensors 18 and 18'. Alternatively, the water heater 160 may include more than one control box, may include more than two heating elements and may include more than two temperature sensors.

Similar to what was disclosed for water heater 150, the heating elements 16 and 16' are activated sequentially or at some predetermined frequency or fashion so that heat is transferred to the tank 11 in a balanced or uniform manner. Additionally, heating elements 16 and 16' are preferably activated by controller 17 utilizing proportion band control techniques.

Figure 7:
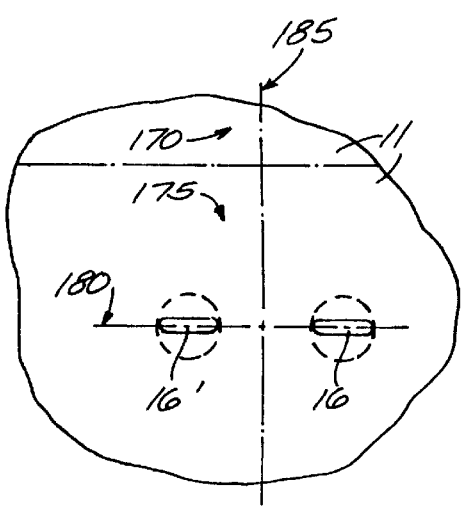
FIG. 7 is a partial sectional view of the water heater shown in FIG. 6.

In the preferred embodiment of water heater 160, the heating elements 16 and 16' are arranged in a plane 180 substantially orthogonal to the longitudinal axis 185 of the tank 11 (i.e., in a substantially "horizontal" plane) (see FIG. 7). However, the heating elements 16 and 16' may be place in any other configuration in the approximately lower one-third volume 175 as long as both elements are in the approximately lower one-third volume 175 (See FIG. 6). Also, if additional heating elements are used, they too are located in the approximately lower one-third volume 210.

Typically, water heaters of the prior art rarely utilize the upper heating element. The upper heating element is typically active only when the water heater is first installed, when the water heater has not been used for a long period of time, or when a large amount of hot water has been extracted from the tank in a short period of time. Except for these rare occurrences, the upper heating element of the prior art is rarely used. Thus, most of the water heated over the life of the unit is heated using only the lower element. The use of only the lower element is energy inefficient, requires a large period of time for recovery of the water temperature to set point temperatures, and often requires a large reserve storage tank of heated water to insure that an adequate supply of hot water is present when needed. The water heater 160 overcomes the above-described deficiencies by placing the second heating element 16' in the approximately lower one-third volume 175 of the tank 11. Arranging the elements 16 and 16' this way and controlling the operation of the elements 16 and 16' by generating sequential pulses having proportional band control allows the water heater 160 to utilize more efficient water heating strategies. This results in the elements 16 and 16' having an improved effective transfer of heat energy to the water. Furthermore, elements 16 and 16' more evenly distribute watt densities, which reduces vaporization losses. Consequently, the water heater 160 has a faster recovery time while using less energy than conventional heaters of the prior art. Moreover, the water heater 160 can have a more compact tank size for comparable hot water demands than the prior art.

Figure 8:
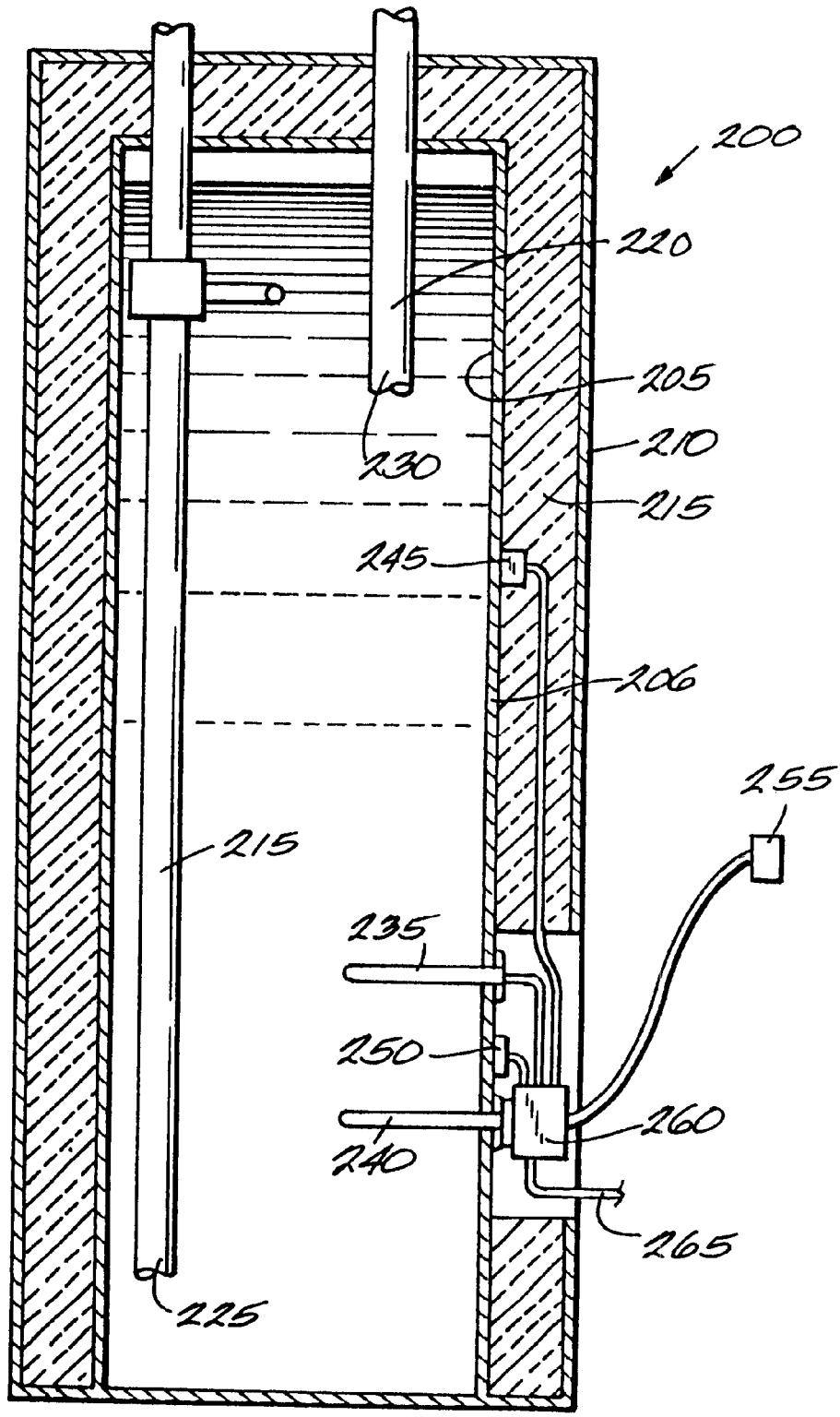
FIG. 8 is a sectional view of a water heater including a controller embodying the invention.

FIG. 8 illustrates another water heater 200 embodying the invention. Water heater 200 includes a permanently enclosed water tank 205, a shell 210 surrounding water tank 205, and foam insulation 210 filling the annular space between the water tank 205 and the shell 210. The water tank 205 has an outer surface 206. Water inlet line or dip tube 215 and water outlet line 220 enter the top of water tank 205. The water inlet line 215 has an inlet opening 225 for adding cold water near the bottom of water tank 205. Water outlet line 220 has an outlet opening 230 for withdrawing hot water from near the top of water tank 205.

The water heater 200 further includes a first resistance heating element 235 and a second resistance heating element 240 extending through the wall of the water tank 205. It is envisioned that the heating elements 235 and 240 may be placed anywhere within the tank 205 and may be of any particular shape. However, preferably, the first and second heating elements 235 and 240 are in a lower one-third volume of the tank 200, and are in a plane substantially orthogonal to a longitudinal axis (similar to FIG. 7). In addition, although the invention will be described with two heating elements 235 and 240, the water heater 200 may include additional heating elements or may contain just one heating element 235. For example, a commercial tank water heater (as compared to a residential tank water heater) may contain as many as fifteen heating elements.

The water heater 200 includes a first water temperature sensor 245 and a second water temperature sensor 250. Both water temperatures sensors 245 and 250 are mounted on the outer surface 206 of water tank 205. The water temperature sensors 245 and 250 are preferably thermistors and are thermodynamically coupled to the water in the water tank 205. Preferably, the water temperature sensor 250 is located on a lower half of the tank 205 and the temperature sensor 245 is located on an upper half of the tank 205. However, it is envisioned that the water temperature sensors 245 and 250 may be mounted on the same half of the tank 205. Additionally, the water heater 200 may include additional temperature sensors or may contain only one temperature sensor 245.

The water heater 200 may include an ambient or room temperature sensor 255. The ambient temperature sensor 255 is located external to the water heater 200, but is located within the surrounding environment of the water heater 200 and senses the temperature of the surrounding environment of the water heater 200. Of course, the water heater 200 may include additional ambient temperature sensors and may include other sensors (e.g., a water consistency sensor).

The water heater 200 includes a proportional band controller or control unit 260 electrically connected to the first and second heating elements 235 and 240, the first and second water temperature sensors 245 and 250, and ambient temperature sensor 255. In general terms, the controller 260 receives a two-hundred-forty volt alternating current (AC) signal from power line 265; modulates a first and second proportional band signal provided to the first and second heating elements 245 and 250, respectively; receives a first and second water temperature signals from the first and second temperature sensors 245 and 250; and receives an ambient temperature signal from ambient sensor 255.

Figure 9:
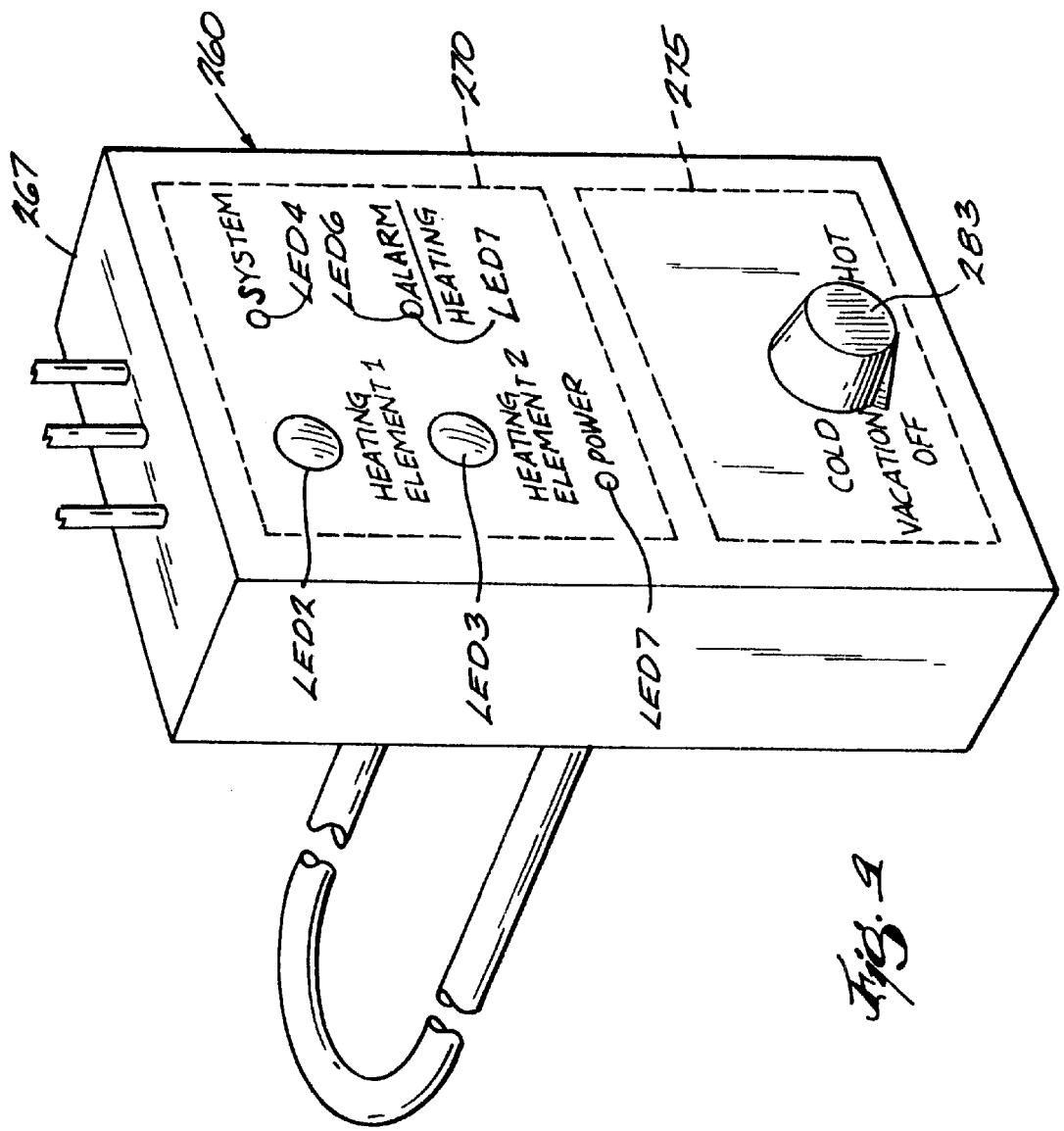
FIG. 9 is an enlarged partial view of the controller shown in FIG. 8.

As shown in FIG. 9, the controller 260 includes a housing 267 having a visual display area 270 and a user entry area 275. The visual display area 270 includes a plurality of light-emitting diodes (LEDs). The LEDs include a first element LED2, a second element LED3, a system LED4, a heat LED5, an alert LED6 and a power LED7. Power LED7 is preferably a red LED and lights any time the electronics are active (i.e., "on"). System LED4 is preferably green and is used to indicate the overall status of the system. During normal operation, the system LED4 blinks approximately one blink per second. The fact that the system LED4 is blinking regularly indicates that the water heater is working properly. Heat LED5 blinks in unison with the system LED4 when the controller 260 is in a "heating" mode (i.e., the water heater is heating the water to a desired). First element LED2 and second element LED3 activate whenever the respective heating elements are active. Alert LED6 and heating LED5 are in the same package. Alert LED6 works in conjunction with the system LED4 to indicate the status of the water heater 200.

During normal operation, if the controller 260 is in a "Stand-by" mode (i.e., the temperature of the water is equal to or greater than the desired water temperature), only the system LED4 blinks. If the controller 260 is in the heating mode, the controller 260 blinks the system LED4 and the heating LED5 in unison. If for any reason there is an error state, then the heating LED5 changes to the Alert LED6, which is red. During the error state, the system LED4 blinks an error code indicating the type of error. Of course, other LEDs can be added, and any of the disclosed LEDs can be removed or modified. Additionally, an audible speaker can be included to provide audible indication, or the information provided by the LEDs can be communicated by other visual indicators (e.g., a liquid crystal display).

The user entry area 280 includes an entry dial 283 for a user to enter a desired water temperature. The entry dial 283 includes an off position (i.e., the water heater 200 is "off"), a vacation position, and a plurality of positions between a low or cold water temperature and a high or hot water temperature. If the entry dial 285 is in the vacation position, then the controller is in a "vacation" mode. The "vacation" mode heats the water to a preset temperature lower than the normal temperature range of the water heater. Alternatively, the user entry area 275 may include other possible devices for entering a desired water temperature state including a plurality of push buttons with a digital LCD display. Of course, the visual display area 275 and the user entry area 280 may be mounted in a second control box located remotely from the water heater 20 (i.e., not mounted on the water heater 20). The second control box in communication with the controller 260 either through a hard-wired connection, or through RF or other appropriate communication scheme.

Figure 10:
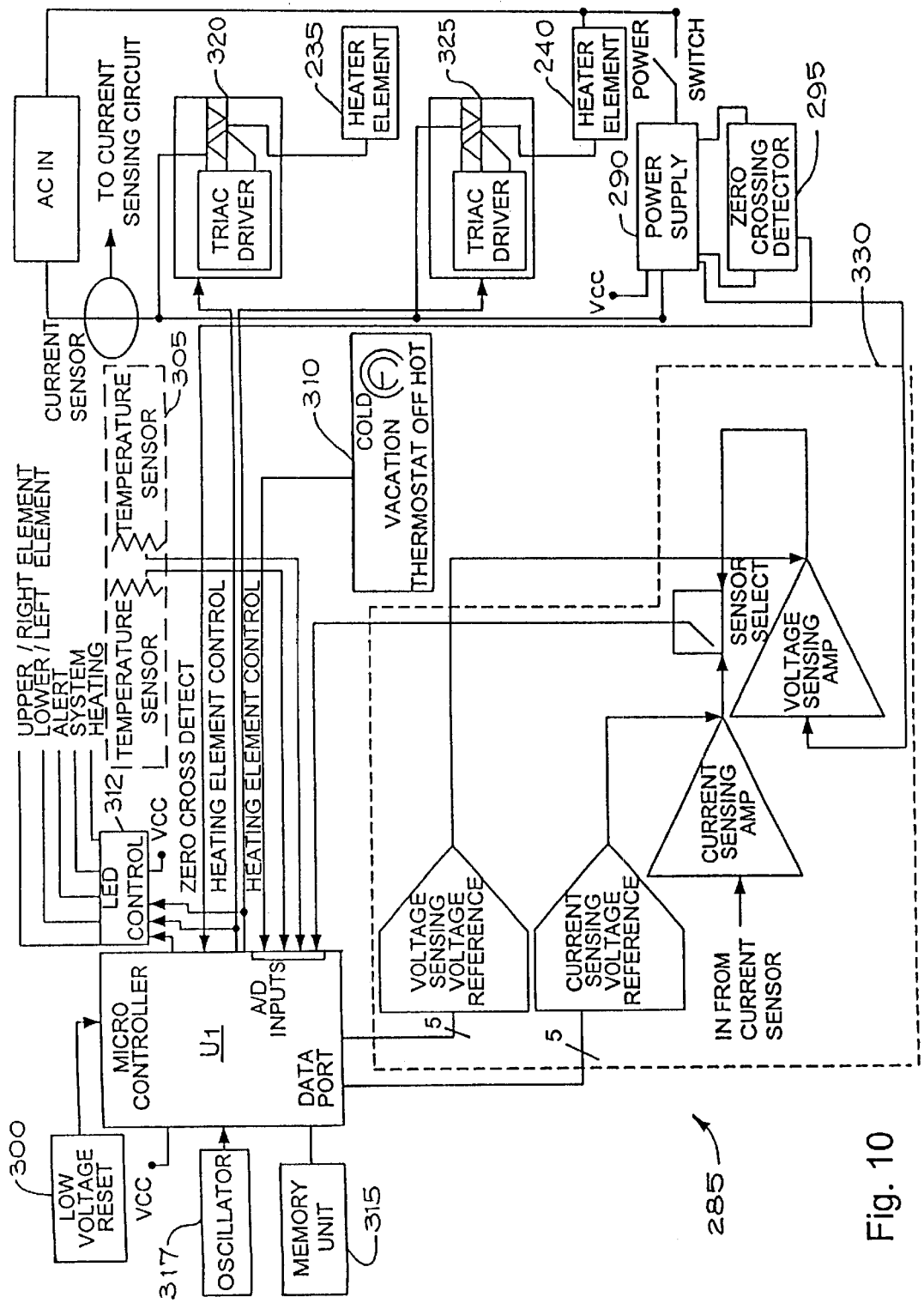
FIG. 10 is a schematic representation of the control circuit shown in FIG. 8.

The controller 260 includes a control circuit 285, which is schematically represented in FIG. 10. In general terms, the control circuit 285 includes a power supply 290, a zero crossing detector 295, a low-voltage reset circuit 300, a temperature sensing circuit 305, a thermostat circuit 310, an LED control circuit 312, a microcontroller U1, a memory unit 315, a first driving circuit 320, a second driving circuit 325, and a dry fire circuit 330.

As shown in FIG. 10, the power supply 290 receives a high-voltage AC signal (e.g., AcIn=240 VAC) from line 260 (FIG. 8) and creates a low voltage AC signal (e.g., AcOut=9 VAC), an unregulated direct current (DC) signal (e.g., V-SNS=5 VDC), and a regulated direct-current signal (e.g., Vcc=5 VDC). An exemplary power supply 290 is shown in greater detail in FIG. 11.

As shown in FIG. 11, the power supply 290 includes a transformer T2 having a primary coil and a secondary coil for transforming the high-voltage AC signal (AcIn) to the low-voltage AC signal (AcOut). The resulting low-voltage AC signal (AcOut) is provided to the zero-crossing detector 295 (FIG. 10) and to a switch S1, which is a single-throw, single pole (SPST) switch connected to the high side of the secondary coil. When the switch S1 is closed, the control circuit 285 is active.

The power supply further includes a fall-wave bridge rectifier D8, a capacitor C26, a zener diode D9, a voltage regulator U9, and capacitors CU1, CU2, CU4, CU7 and CU8. The bridge rectifier D8 rectifies the low-voltage AC signal (AcOut) and the capacitor C26 filters the signal resulting in the unregulated DC signal (VSNS). The zener diode D9 caps the unregulated DC signal (VSNS) and protects the input of the voltage regulator U9 from short-term, over-voltage transients. The voltage regulator U9 regulates the voltage to a Vcc signal of five volts and each of the capacitors CU1, CU2, CU4, CU7 and CU8 on voltage regulator U9 are decoupling capacitors dedicated to a respective integrated circuit. For example, capacitor CU1 is a decoupling capacitor for integrated circuit U1.

Referring back to FIG. 10, the power supply 290 provides the low voltage AC signal (AcOut) to zero-crossing detector 295. An exemplary zero-crossing detector 295 is shown in greater detail in FIG. 12. Zero-crossing detector 295 provides an output signal (ZeroCross) which indicates each time the detector 295 detects that the low voltage signal (AcOut) has changed plurality. The zero-crossing detector 295 includes resistors R55, R61 and R53, capacitor C21, diode D1, and transistor Q8. The resistor R55 receives the low-voltage AC signal (AcOut). The diode D1, capacitor C21, and resistor R61 are connected in parallel with one end connected to resistor R55 and the base of transistor Q8 and the other end connected to the emitter of transistor Q8. Resistor R53 has one end connected to Vcc and the other end connected to the collector of transistor Q8. The zero-crossing signal (ZeroCross) is generated at the collector of transistor Q8. As the AC voltage changes polarity, Q8 goes back and forth between the off state and saturation, generating a series of pulses having a front edge. The front edge of each pulse corresponds to a zero crossing.

Referring back to FIG. 10, the control circuit 285 includes a low-voltage reset circuit 300. An exemplary low-voltage reset circuit 300 is shown in greater detail in FIG. 13. The low voltage reset circuit includes an integrated circuit U3, which is preferably a Motorola MC34064P-5 (although other circuits may be used) connected to a capacitor C18, and resistors R45 and R46. The integrated circuit U3 provides an under voltage reset protection signal to the microcontroller U1. In the event that power should fail or "brown" out, integrated circuit U3 causes the microcontroller U1 to reset. Preferably, this occurs as soon as the requested DC signal drops below four and one-half volts. The low-voltage reset circuit ensures that the control circuit 285 safely operates and does not malfunction due to low-line power.

Referring back to FIG. 10, the control circuit 285 includes a temperature sensing circuit 305. The temperature sensing circuit 305 in combination with first and second water temperature sensors 245 and 250 transmits a water temperature for the water heater 200 to the microcontroller. As shown in greater detail in FIG. 14, the temperature sensing circuit includes resistors R70 and R71, and thermistors RT1 and RT2, which have a negative temperature coefficient. Resistor R70 and thermistor RT1 form a first voltage divider resulting in a first temperature signal (First-Sensor), and resistor R71 and thermistor RT2 form a second voltage divider resulting in a second temperature signal (Second-Sensor). Since the first and second voltage dividers are preferably the same, only the first voltage divider will be discussed in detail. As the temperature on the outside of the water tank 205 increases, the resistance in the thermistor RT1 decreases causing the output voltage (First-Sensor) to increase. The voltage (First-Sensor) is read by an analog-to-digital (A/D) converter in microcontroller U1 resulting in an eight-bit number. The eight-bit number is used as an index to a lookup table that has a plurality of corresponding sensed temperatures. Based on the eight-bit number, a sensed temperature results.

As the water inside the tank 205 increases in temperature, there is an increasing error in what the temperature sensor 245 or 250 senses. That is, the thermal conductive path from the water through the material of the water tank 205 has a lag time differential. To correct this, the sensed temperature value read from the lookup table is "corrected" by a linear equation. The corrected temperature is used in making water heating decisions by the microcontroller U1.

Referring back to FIG. 10, the control circuit includes a thermostat 310. As shown in greater detail in FIG. 15, the thermostat is a potentiometer R65 wired as a voltage divider and having a resistance range (e.g., 20 kOhms). The output signal of the voltage divider (Thermostat) is converted to an eight-bit number by the microcontroller U1 and then scaled to produce a set-point temperature value. The set-point temperature value is the temperature to which the water will be heated.

Referring back to FIG. 10, the control circuit 285 includes an LED control circuit 312. The LED control circuit 312 controls the activation of the light-emitting diodes LED2, LED3, LED4, LED5, LED6 and LED7. As shown in greater detail in FIG. 16(*a*), the LED controller 312 includes resistors R56, R57, R58, R59, R60, R47, R48, R49, R50, R51 and R52, and transistors Q3, Q4, Q5, Q6 and Q7. When switch S1 (FIG. 11) is closed, the power supply 290 generates a regulated low-voltage DC signal (Vcc) that is provided to LED7 and resistor R52. The provided low-voltage regulated DC signal (Vcc) lights LED7. For controlling LED2, LED3, LED4, LED5 and LED6, a five-bit signal is provided to resistors R56, R57, R58, R59 and R60. If any of the bits are high, a low-voltage DC signal is provided to the respective resistor R56, R57, R58, R59 or R60 resulting in a base current sufficient to allow current flow through the respective transistor Q3, Q4, Q5, Q6 or Q7. The current flows from Vcc through the transistor Q3, Q4, Q5, Q6 or Q7, through the respective light emitting diode LED2, LED3, LED4, LED5 or LED6, to ground.

Figure 16A:
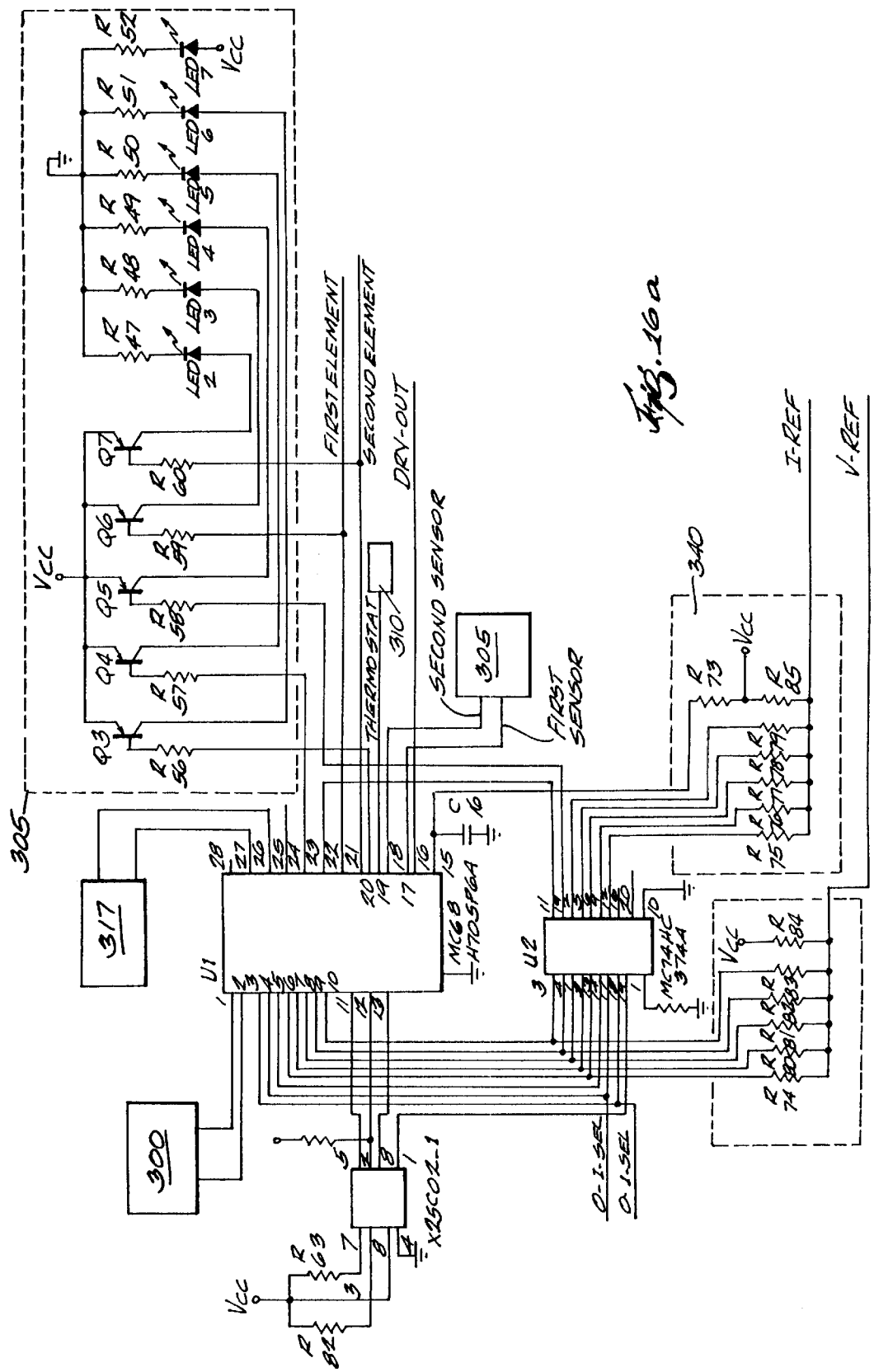
FIGS. 16(a) and 16(b) are an electrical schematic of portions of the control circuit depicted in FIG. 10.
Figure 16B:
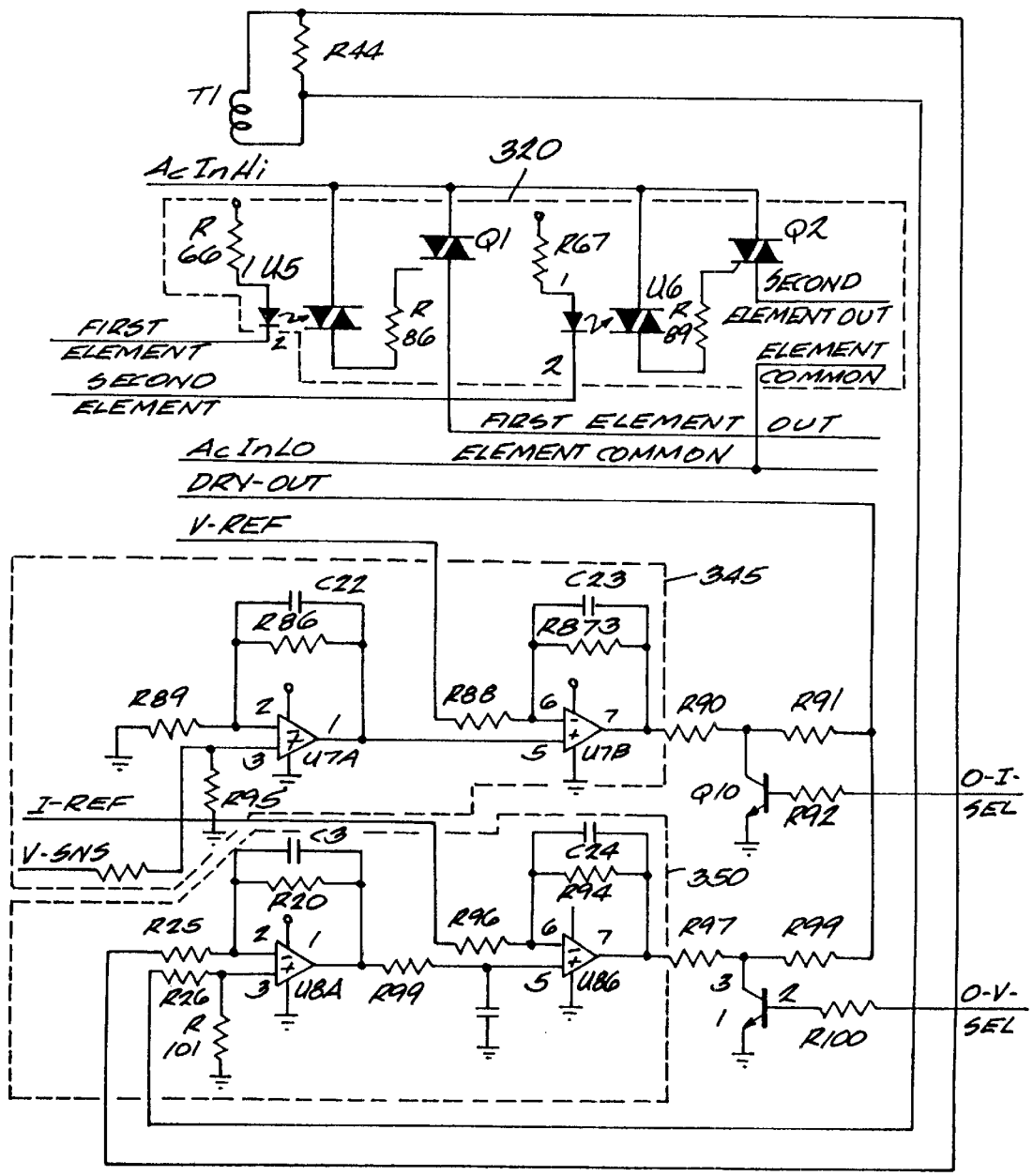

Referring back to FIG. 10, the control circuit includes a microcontroller or processor U1 and a memory unit 315. The microcontroller U1, which is also shown in FIG. 16(*a*), is preferably a 28-pin Motorola MC68HC705P6A (although other microcontrollers may be used). The microcontroller U1 includes an eight-bit input/output port (pins 3–10), a three-bit serial interface (pins 11–13), a four-bit analog to digital converter (pins 15–19), memory for storing a software program that operates the microcontroller, and two pins (pins 26 and 27) for receiving a signal from an oscillator 317 (FIG. 17). The memory unit 315 includes a two hundred fifty six byte Electrically Erasable Programmable Read Only Memory (EEPROM) chip U4. The EEPROM U4 is used to store configuration data, such as water heater construction specifics (e.g., operating voltage, tank water capacity, resistances of various elements, etc.), user usage pattern data, element type data, and other related data. With the EEPROM data and real-time sensory data (e.g., the sensed temperature of the first and second water temperature sensors 245 and 250), the micro controller U1 implements a software program to control the heating elements to heat and maintain water temperature. In addition, the software program includes at least one subroutine to determine whether water is surrounding each heating element.

Referring back to FIG. 10, the control circuit includes a first driving circuit 320 and a second driving circuit 325 that control the power being provided to the first and second heating elements 235 and 240, respectively. The driving circuits are identical and, thus, only driving circuit 320 will be discussed in detail. As shown in FIG. 16(*b*), the first driving circuit 320 includes resistors R66 and R86 a triac Q1, and an opto coupled zero-cross triac driver U5. The triac driver U5 is gate driven as determined by gate pulses being received from the output of the microcontroller U1. A pulse train is generated by the microcontroller U1, which determines the power levels being delivered to the heating element 235 (FIG. 10). For example, the microcontroller U1 may provide a pulse train to the triac driver U5 resulting in a sixty-six percent power transfer (i.e., sixty-six percent of the available power is transferred to the heating element), or may provide a pulse train to the triac driver U5 resulting in a forty percent power transfer. The triac driver U5 is coupled to the zero-crossing detector 295 to insure that the triac turns completely off when the set point temperature is reached. Without the use of driver U5, the triac Q1 could remain partially open in a conduction state and potentially effect the reliability of the control circuit 285.

Referring back to FIG. 10, the control circuit includes a dry fire circuit 330. As shown in greater detail in FIGS. 16(*a*) and 16(*b*), the dry fire circuit 330 includes data latch U2

(16(a)), a first resistor ladder 335 (16(a)), a second resistor ladder 340 (16(a)), a voltage sensing amplifier 345 (16(b)), a current sensing amplifier 350 (16(b)), resistors R90, R91, R92, R97, R98 and R100 (all in 16(b)), transistors Q9 and Q10 (both in 16 a current sensor T1 (16(b)), and a resistor R44 (16(b)). The data latch U2 is preferably a Motorola 74HC374 data latch (other data latches may be used) and is used to hold a five-bit data word that controls the first and second resistor ladders 335 and 340. The first resistor ladder 335 generates a voltage that is used as a reference by the voltage sensing amplifier 345. Once this reference voltage has been set or calibrated, the data latch U2 is used to control the second resistor ladder 340 to generate a voltage that is used as a reference by the current sensing amplifier 350. The latch also holds three additional data bits. The first data bit (bit 7), controls one of the display LEDs; the second data bit (bit 6), selects the EEPROM; and the third data bit (bit 5), enables communication with off-board testing equipment. The current sensor T1 and the resistor R44 create a voltage that is proportional to the current being provided to the heating elements. Transistors Q9 and Q10 select which amplifier is currently providing a signal to the microcontroller U1.

The basis for the "DryFire" test is the measurement of the peak voltage and peak current on an "almost" cycle by cycle basis. The reason that the measurement is not exactly cycle-by-cycle is that the voltage is measured after it has been rectified and filtered. Changes in the AC line voltage manifest as changes in the rectified DC voltage. Because of the time constant of the capacitor C26, with the resistance in the secondary windings of the power transformer, voltage and current samples are taken on a cycle-by-cycle basis and stored in a buffer. When the buffer is full, the voltage samples are examined to determine whether the voltage was stable during the time period it took to fill the buffers. If the variance is within acceptable limits, the voltage and current samples are average and a simple resistance calculation is performed (i.e., R=V/I).

When the manufacturer assembles the water heater 200, the manufacturer programs into the memory unit 315 the components used for assembly of the water heater 200, the capacity of the water tank 205, and/or product information about particular components of the water heater 200. For example, the manufacturer may program one or more tank characteristics and/or one or more element characteristics into the memory unit. The tank characteristics may include, but are not limited to, tank diameter, tank height, tank storage capacity, etc. The tank characteristics determine heating convection current flow patterns within the tank 205 that create different temperature water strata layers in the tank 205. The element characteristics may include, but are not limited to, number of elements, element type, voltage of an element, physical location of an element (e.g., upper and lower, or side-by-side), element watt density, etc. The element characteristics help to provide information on how effectively the elements 235 and 240 will heat the water.

In addition, some of the tank or element characteristics can be determined by the microcontroller U1. For example, the microcontroller can calculate an element wattage for a particular element by applying a voltage to the element and calculating a resistance for the element over time.

Preferably, all of the water heater tank characteristics and element characteristics are programmed into the memory unit 315. Based on the variables and characteristics, the microcontroller U1 obtains from a lookup table a code specific to the water heater 200. The software of the microcontroller U1 creates a heating strategy for the water heater 200 based in part on the water heater code (discussed below). The microcontroller U1 can update the water heater code if it senses that an element has been replaced or if a repairperson reprograms the data stored in the memory unit 315. Additionally, although the manufacturer programs each variable or characteristic into the memory unit 315, it is envisioned that the manufacturer can directly program the code into the memory unit 315.

Because there are a diversity of tank characteristics and elements used in the manufacture and construction of electric water heaters, one heating strategy alone is unable to account for the numerous constructions. Instead, the software assigns a code to the water heater 200 based on the variables and characteristics of the water heater 200. The variables and characteristics define a water heater signature and, when used with a water heater usage pattern, create a more reliable effective and energy efficient water heater.

Figure 18:
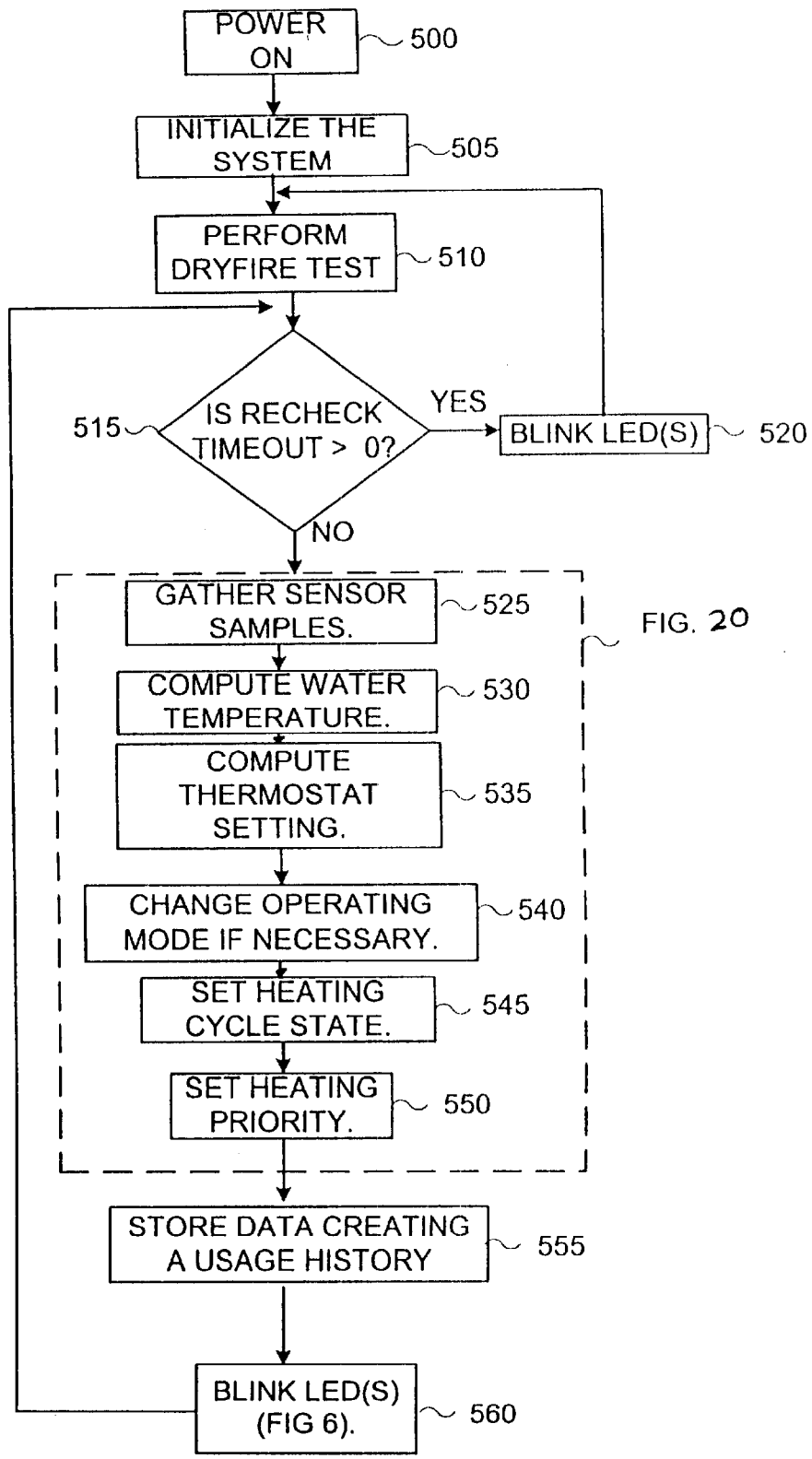
FIG. 18 is a flowchart representing a method of controlling the water heater shown in FIG. 8.

In operation of water heater 200 and referring now to FIG. 18, a user "turns-on" the water heater 200 (act 500) by turning the thermostat 310 clockwise from the off position. This closes switch S1. Upon closing switch S1, the power supply 290 generates the low-voltage AC signal (AcOut), the unrectified DC signal (V-SNS) and the rectified DC signal (Vcc). Once the power source generates a Vcc greater than four and one-half volts, the low voltage reset 300 brings the microcontroller U1 out of reset. If at any time the voltage drops below four and one-half volts (e.g., a user turns the system off, a "black-out" occurs, or a "brown-out" occurs), the low voltage reset 300 provides a signal to the microcontroller U1 resetting the microcontroller U1.

At act 505, after the microcontroller U1 comes out of reset, the software initializes the microcontroller U1. The software resets all variables to their default values, and resets all outputs to their respective default states.

At act 510, the microcontroller performs a "DryFire" test. The term "DryFire" refers to the heating of a heating element 235 or 240 that is not submerged in water. Usually, a "Dry Fire" will destroy or burn-out the heating element 235 or 240 in less than a minute. The control circuit 285 performs the "DryFire" test to determine whether the heating element is surrounded by water.

In general terms, the control circuit 285 performs the "DryFire" test by measuring the peak current and the peak voltage being applied to each heating element 235 and 240 and making a resistance calculation based on the measurement. For example, by applying a voltage to one of the heating elements 235 or 240 for a specific period of time and measuring the resistance at the beginning and end of the test period, the status of the heating element 235 or 240 can be determined. As the element 235 or 240 heats up, its resistance increases. If the element is in water, the element reaches equilibrium (i.e., a steady temperature and resistance), very quickly. Conversely, if the element 235 or 240 is "dry", it continues heating and reaches high temperatures (and resistances) in a very short time. At the end of the test, the beginning and ending resistances are compared. For a "wet" element, the difference between the beginning and ending resistances is small, while for a "dry" element, the difference between the beginning and ending resistances is many times larger than when the element is wet.

In addition, by varying the length of the DryFire test, the watt density of the heating element 235 or 240 can be accurately measured. Based on the watt density, the microcontroller U1 can update the water heater code.

Figure 19:
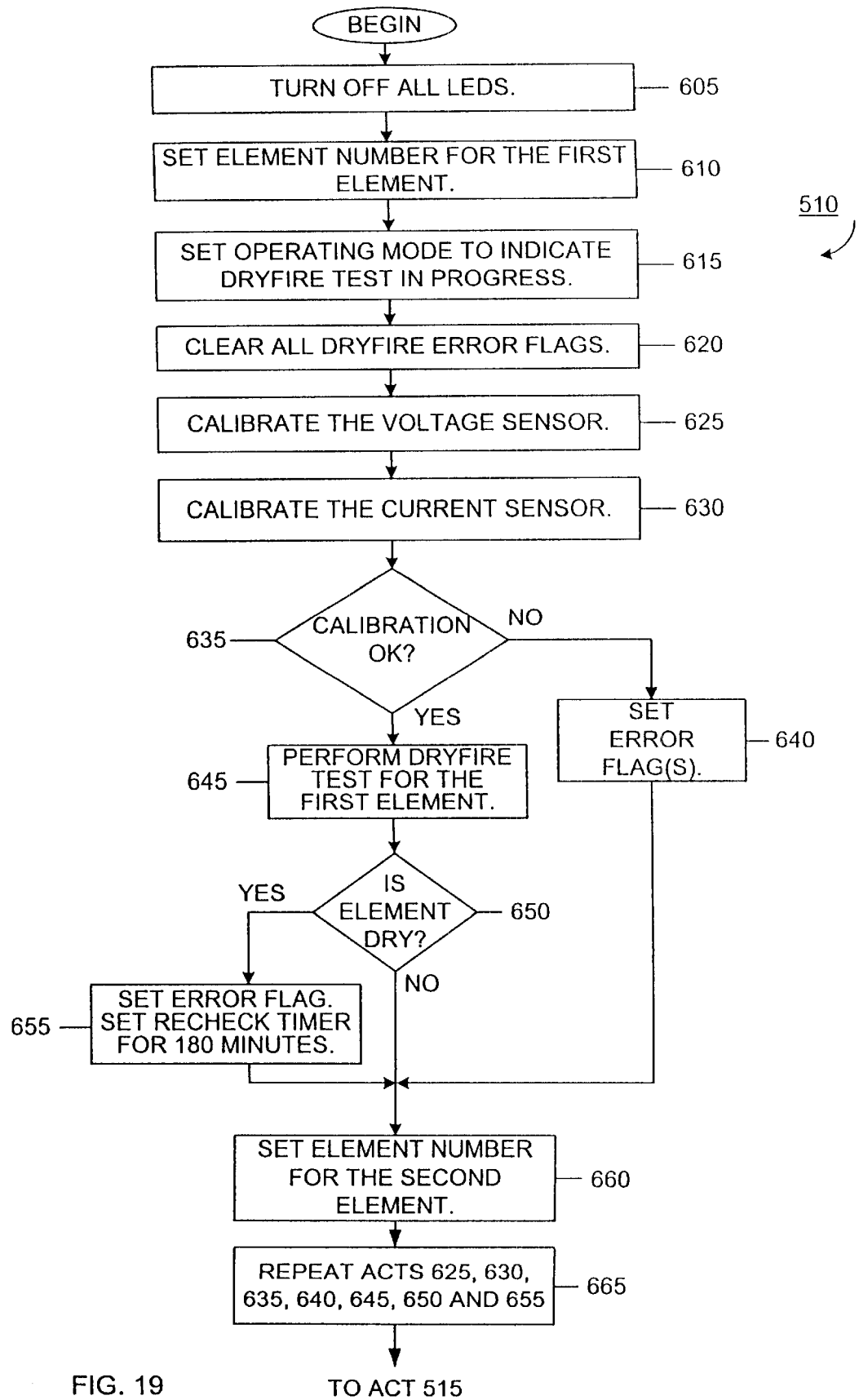
FIG. 19 is a flowchart representing an exemplary method for performing a test to determine whether a heating element is submerged.

An exemplary method for performing the DryFire test is shown in FIG. 19. At act 605, the microcontroller U1 deactivates all the LEDs during the DryFire test. Deactivating the LEDs ensures that the blinking of the LEDs does not affect the test. At act 610, the software sets an element number indicating the first heating element 235 is being tested. At act 615, the software sets the operating mode for the microcontroller U1 to a DryFire mode which informs all subroutines that the microcontroller U1 is performing a DryFire test. At act 620, the software clears all DryFire error flags. The DryFire error flags indicate whether the most recent DryFire test (if one occurred) resulted in an error. For example, if the previous DryFire test resulted in an error flag corresponding to the first element being "dry", then the microcontroller U1 resets the error flag pending the results of the current test.

At act 625, the microcontroller U1 calibrates the voltage amplifier 345. Before any voltage samples can be taken for DryFire calculations, the voltage amplifier 345 must be calibrated using a variable reference voltage generated by data latch U2 and resistor ladder 335. To accomplish this calibration, the microcontroller U1 first selects the output of the voltage sensing circuit by driving Q10 into saturation (Q9 is off). The reference voltage (V-REF) is then set to its highest value. Next, the reference voltage (V-REF) is incrementally reduced until the output of the voltage amplifier (Dry-Out) reaches a predetermined value. The reference voltage is then left at this value.

For example, V-SNS is a non-regulated DC signal having a steady-state component and a small "alternating current" component. Any increases or decreases in the signal being provided to the transformer (AcIn) will reflect in the small "AC" component of V-SNS signal. In order for the microcontroller U1 to notice any changes of significance, the voltage amplifier 345 amplifies small "AC" component changes. If, for example, the steady state is 2.0 volts, any reference voltage (V-REF) feeding resistor R88 (FIG. 16(b)) above 2.0 volts will result in no amplification taking place and the output of the amplifier will be zero. If the reference voltage (V-REF) is below 2.0 volts, amplification will take place. The reference voltage (V-REF) is adjusted so the output of U7B is somewhere in the middle of its output swing (e.g., 0–3.5 volts). The microcontroller U1 continues to reduce the reference voltage (V-REF) in steps until a desired output is reached (e.g., reference voltage is equal to 1.5 volts). Thus, any changes in the line voltage are exaggerated by a factor equal to the gain of U7B.

At act 630, microcontroller U1 calibrates the current amplifier 350. As with the voltage amplifier 345, the second stage, U8B (FIG. 16(b)), must be calibrated before sampling can begin. The current sensing circuit is selected by driving Q9 into saturation (Q10 is off) and then incrementally adjusting the reference voltage (I-REF) similar to the reference voltage (V-REF).

At act 635, the software determines whether the voltage and current amplifiers 345 and 350 were properly calibrated. If there was an error in the calibration, then the software sets a calibration error flag(s) (act 640) to a positive result and proceeds to act 660. If the calibration did not result in any errors, then the microcontroller U1 proceeds to act 645.

At act 645, the microcontroller U1 performs a DryFire test for the first element 235. For the test, instantaneous voltages and currents are measured at their peak values. This is accomplished by sampling the signal from the voltage and current amplifying circuits 345 and 350 (Dry-Out) relative to a zero crossing of the low-voltage AC signal (AcOut). At the appropriate zero crossing, a timer is started for each of the amplifying circuits 340 and 350. A time-out variable is used to take the voltage or current samples at a predetermined time period with respect to the zero crossing when the voltage and current waveforms are at their peak. The instantaneous voltage and current samples are each loaded into separate buffers within the microcontroller U1. When the buffers are fall, the data is analyzed to determine if the line voltage has been stable during the sampling period. If the sampled voltage is stable, an average voltage and current is computed, and a resistance calculation is made. Calculations continue in this manner for the duration of the DryFire test. At the end of the test, the beginning and ending resistance values are subtracted to find out how much the resistance has changed over the course of the test. The basis of the test is not the actual value of resistance (which is different for each type of heating element), but the difference in resistances from the beginning of the test to the end of the test.

At act 650, the microcontroller U1 determines whether the first element 235 is dry. If the calculated resistance difference is greater than a set resistance change value (which may vary depending upon the heating element used) then the microcontroller U1 determines that the element is not surrounded by water (i.e., "dry") and proceeds to act 655. If the microcontroller U1 determines that the calculated resistance change is equal to or less than a set resistance change value, then the microcontroller U1 determines that the element is surrounded by water and proceeds to act 660.

At act 655, the software sets a first element error flag to a positive result. A positive first element error flag informs subsequent subroutines that the first element 235 is not surrounded by water. Consequently, later subroutines will not use this element to heat the water. The microcontroller U1 will also set a ReCheck timer to 180 minutes. The ReCheck timer will decrease in time until it reaches zero minutes. When the ReCheck timer reaches zero, the microcontroller U1 will perform another DryFire test on that element.

At act 660, the microcontroller U1 sets the element number to the second element. At act 665, the microcontroller U1 repeats acts 625, 630, 635, 640, 645, 650 and 655 for the second element to determine whether the second element is dry. If the microcontroller U2 determines the second element is dry, it will set a second element error flag to a positive result. Of course, if the water heater includes more than two heating elements, then the microcontroller U2 performs a dry test for the remaining elements. Additionally, if the water heater contains only one heating element, then the microcontroller U2 will not perform acts 660 or 665.

Referring back to FIG. 18, at act 515, the software determines whether a "ReCheck" timeout is greater than zero. The ReCheck timeout is a timer (e.g., twenty milliseconds) used by the software to inform the software when to sample the temperature sensors 245, 250 and 255, and create or modify a heating strategy for heating the water contained within the water heater 200. If the ReCheck timeout is greater than zero, then the software proceeds to act 520. If the ReCheck timeout is less than or equal to zero, then the software proceeds to act 525.

At act 520, the microcontroller U1 "blinks" the system LED4, the heat LED5 and the alert LED6. That is, the software performs a subroutine that activates appropriate LEDs depending on the mode the software is in or if an error flag has occurred. For example, during normal operations, microcontroller 305 generates a signal resulting in the system LED4 to blink on and off. If the software is in a heating mode (discussed below), then the heat LED5 blinks in unison with the system LED4. If the software has a positive error flag, the alert LED6 works in conjunction with the system LED4 to indicate the status of the water heater 200 to an operator or repairperson.

If the ReCheck timeout is less than or equal to zero, then the microcontroller U1 proceeds to Act 525. In general terms, the microcontroller U1 samples temperature sensor samples (act 525), computes a water temperature (act 530), computes the thermostat setting (act 535), establishes an operating mode (act 540), sets a heating cycle state (act 545), and sets a heating priority (act 550). An exemplary method implementing acts 525, 530, 535, 540, 545 and 550 is shown in FIG. 18. In addition, the microcontroller U1 stores data for creating a usage history (act 555) and blinks the LEDs (560).

Figure 20A:
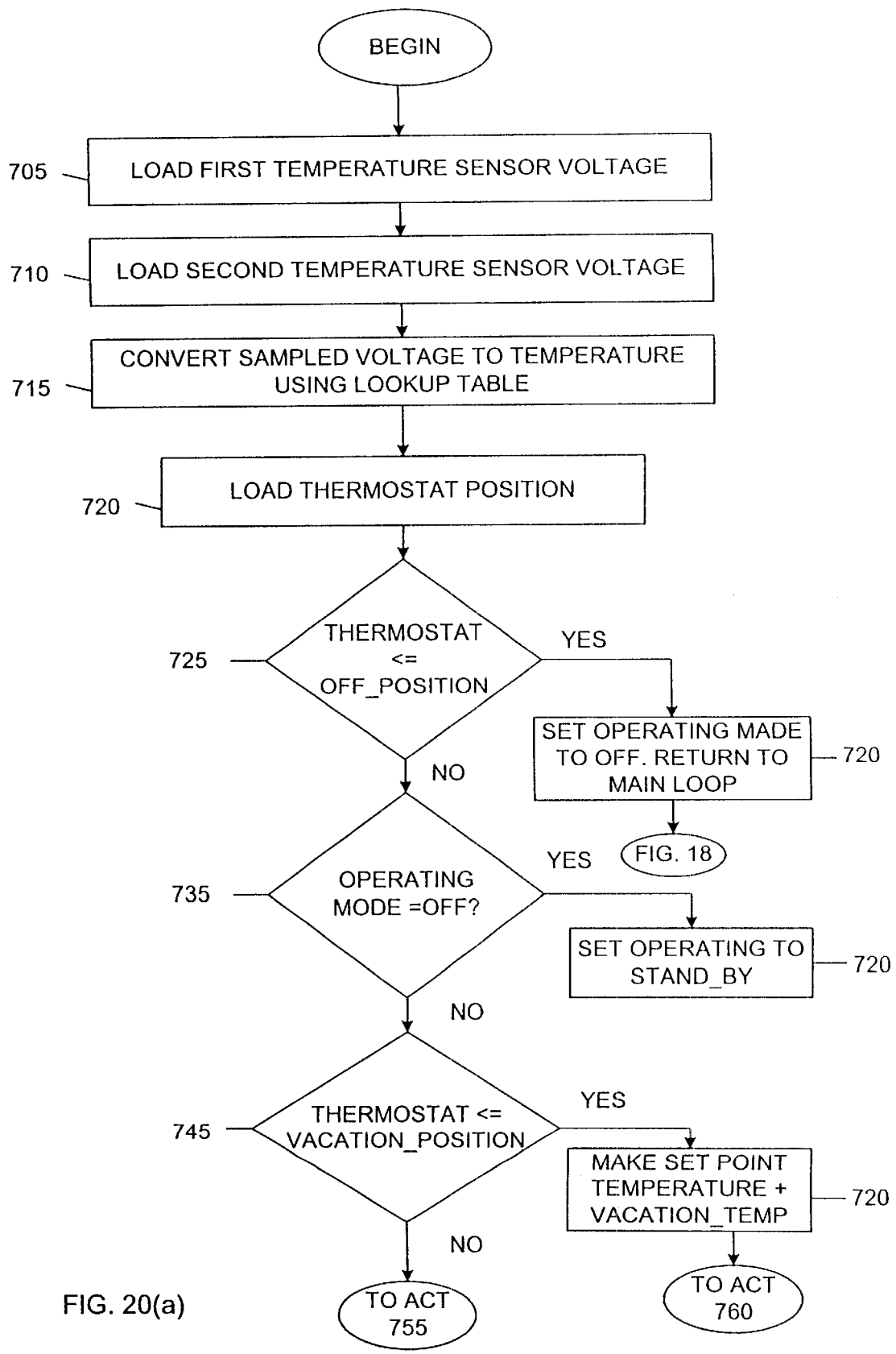
FIGS. 20a, 20b, 20c and 20d are portions of a flowchart representing an exemplary method of performing the acts of gathering sensor samples, computing water temperature, computing a thermostat setting, changing operating mode if necessary, setting a heating cycle state, and setting a heating priority.

At act 705 (FIG. 20(a)), the microcontroller U1 samples temperature sensor 245 and loads a resulting first voltage into the software for processing. At act 710, the microcontroller U1 samples temperature sensor 250 and loads a resulting second voltage into the software for processing. At act 715, the microcontroller U1 converts the first and second sampled voltages to a first and second sensed temperatures, respectively, using a temperature lookup table. The look-up table contains a plurality of voltage ranges having a respective associated temperature. For example, if the first temperatures sensor generates a 2.1 volt signal, the associated temperature may be 110 degrees fahrenheit. The look-up table can vary depending on the sensor used. After obtaining the first and second sensed temperatures, the software modifies the sensed temperatures to take into account any lag time in obtaining the temperature. That is, as the water inside the tank 205 increases in temperature, there is an increasing error in what the temperature sensor 245 or 250 senses. The thermal conductive path from the water through the material of the water tank 205 has a lag time differential. To correct this, the temperature values read from the lookup table are "corrected" for the lag. The corrected first and second temperatures are used in making water heating decisions by the software.

At act 720, the microcontroller U1 loads or samples a signal from the thermostat 310. If the microcontroller U1 determines that the thermostat voltage corresponds to the thermostat being in offposition (act 725), then the software sets an operating mode equal to an off state (act 730) and returns to act 555 of FIG. 18. For example, if the thermostat voltage is less than 0.1 volts, then the software determines the thermostat is in an off position and turns off the controller 260. If the thermostat voltage is greater than a voltage corresponding to an off position (act 725), then the software proceeds to act 735.

At act 735, the software determines whether the operating mode was previously set to off (i.e., the system was just turned on). If the operating mode was previously off, then the software changes the operating mode to "stand-by" (act 740). As will be discussed in more detail below, when the water heater 200 is in a stand-by mode, the controller 260 is not increasing the temperature of the water. If the operating mode is in a mode other than the off operating mode, then the software proceeds to act 745.

At act 745, the software compares the thermostat voltage with a set voltage representing the vacation position of the thermostat. For example, if the thermostat voltage is less than 0.7 volts, then the software determines that the thermostat is set to the vacation position and proceeds to act 750. If the thermostat voltage is greater than 0.7 volts, then the software determines that a user has set the water heater to a desired temperature and proceeds to act 755.

At act 750, the software sets the set point temperature equal to a vacation temperature (e.g., 90 degrees Fahrenheit). The vacation temperature may be a manufacturer-determined value, or may be preset by a user. After setting the set-point temperature, the software proceeds to act 760 (FIG. 20(b)).

Figure 20B:
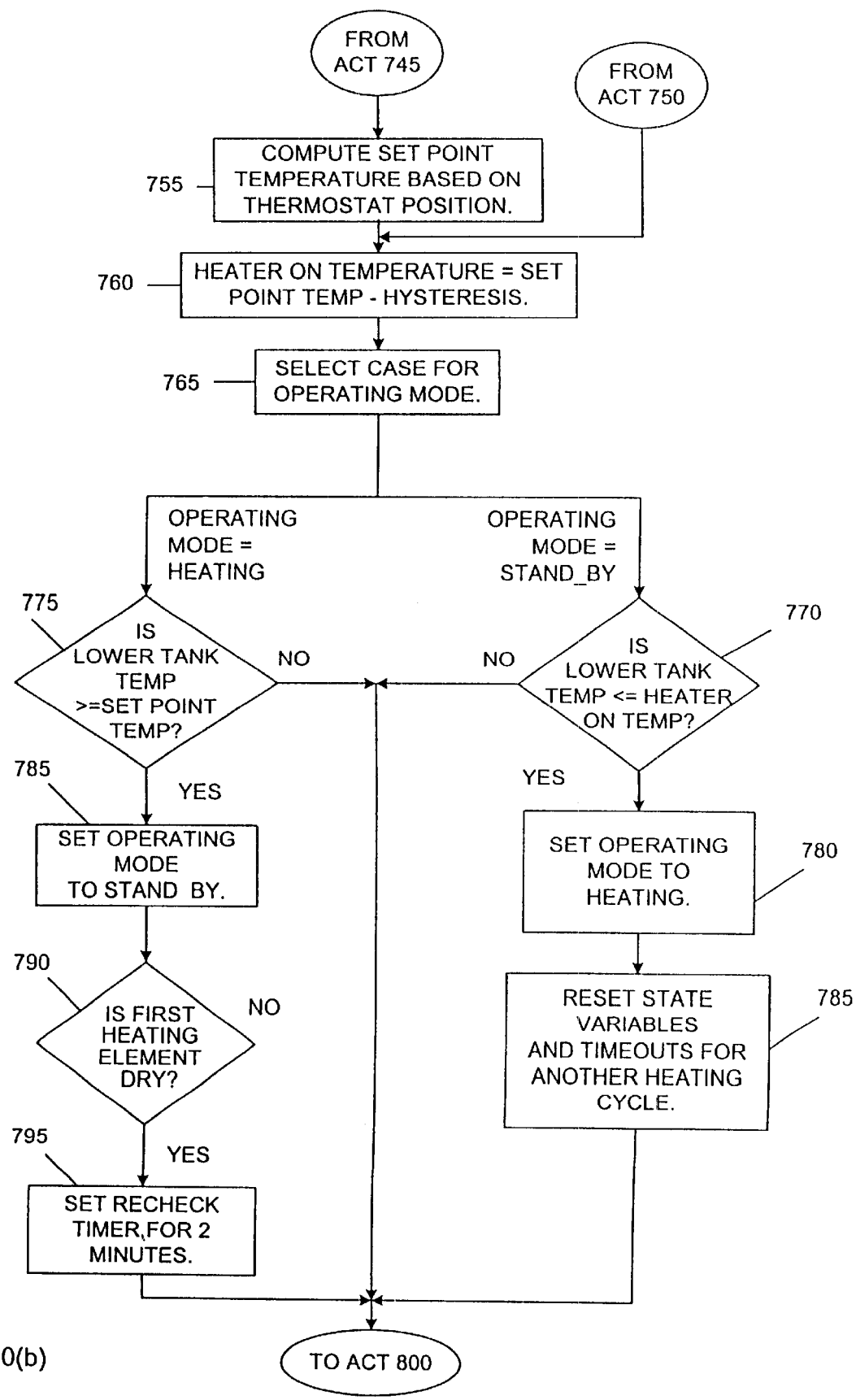

At act 755 (FIG. 20(b)), the software computes a set point temperature based on the sampled thermostat voltage. The microcontroller U1 preferably uses a second lookup table, but may alternatively use a formula based on the input voltage.

At act 760, the software computes a heater-on temperature. The heater-on temperature is the temperature at which one or more elements receive a power signal. The heater-on temperature is the set-point temperature minus a hysteresis temperature. The hysterisis temperature is the number of degrees fahrenheit (e.g., 10 degrees fahrenheit) that the water temperature drops below the set-point temperature before heating occurs. Thus, by calculating a heater-on temperature, the microcontroller U1 avoids "under cycling".

At act 765, the software determines whether the operating mode is in a "stand-by" mode or a "heating" mode. If the operating mode is set to stand-by, the software proceeds to act 770. If the operating mode is set to heating, then the software proceeds to act 775.

At act 770, the software determines whether the lower-tank temperature (from temperature sensor 250) is less than or equal to the heater-on temperature. If the lower-tank temperature is less than or equal to the heater-on temperature, then the software determines that the water should be heated and proceeds to act 780. If the lower-tank temperature is greater than the heater-on temperature, then the software determines that the water should not be heated and proceeds to act 800.

At act 780, the software sets the operating mode to the heating made indicating that the water should be heated. After setting the operating mode to heating, the software resets all operating state variables and timeouts for another heating cycle (act 785). For example, the software resets the ReCheck timeout (e.g., to twenty milliseconds.)

If, at act 765, the software determines the operating mode is set to heating, the software proceeds to act 775. At act 775, the software determines whether the lower tank temperature is greater than or equal to the set point temperature. If the lower tank temperature is greater than or equal to the set point temperature, then the software determines that the water should continue to be heated, and therefore stays in the heating mode and proceeds to act 800. If the lower tank temperature is less then the set point temperature, than the software determines that the water has been properly heated and proceeds to act 785.

At act 785, the software changes the operating mode to stand-by (i.e., indicating that the water temperature no longer should increase). At act 790, the software determines whether the first heating element 235 is surrounded by water (this is assuming the first element is above the second 235). If the first heating element 235 is not surrounded by water (i.e., the element is dry), then the software sets the ReCheck timeout variable to two minutes (act 795). By changing the length of the ReCheck timeout variable, the software allows the water tank to fill with more water before heating with the first element. Of course, the amount of time the software sets the ReCheck timeout variable to can vary, and a specific value is not required for purposes of the invention to work. If the first element does have water surrounding the element (i.e., a wet state has resulted), then the software proceeds to act 800.

Figure 20C:
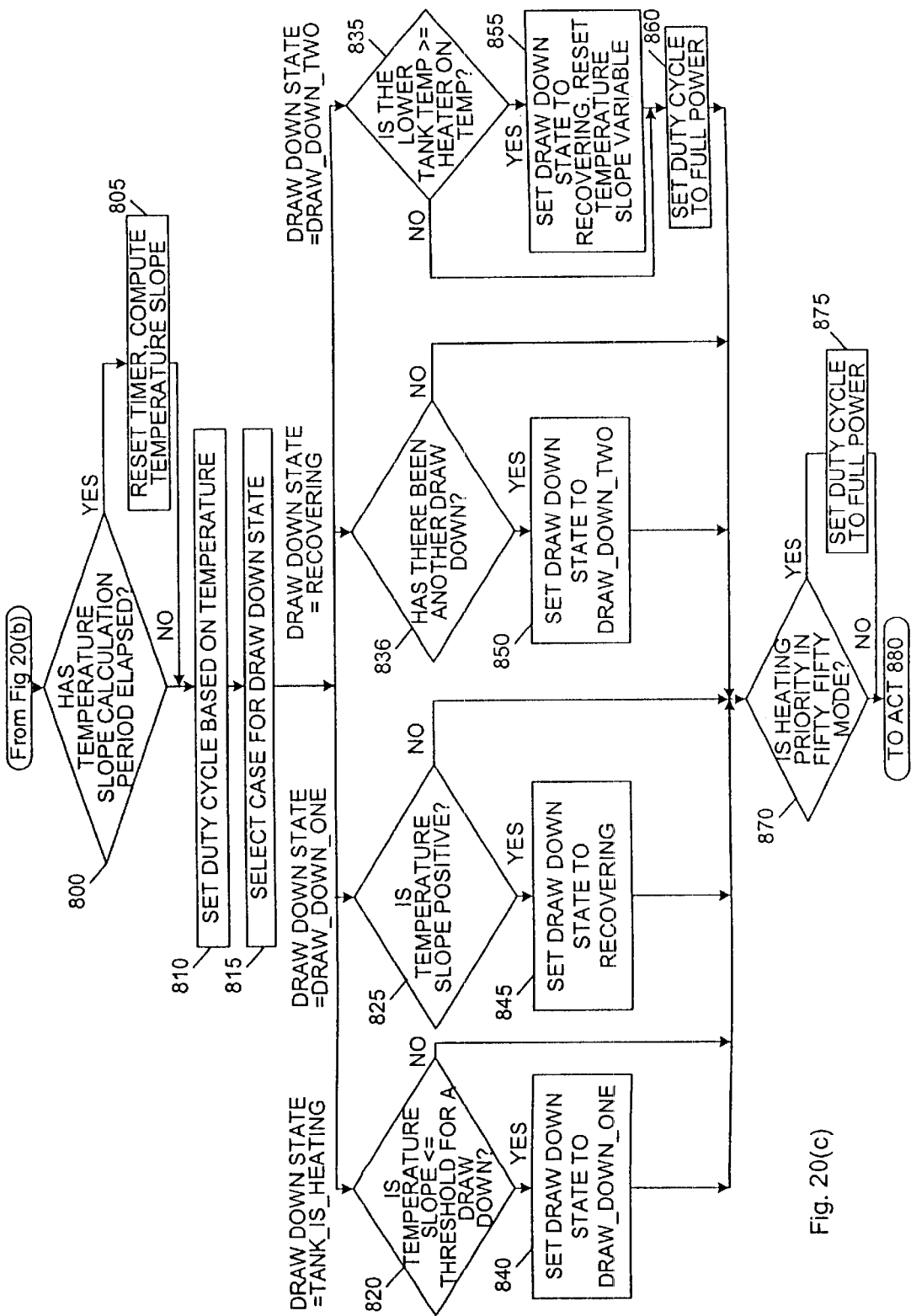
Figure 20D:
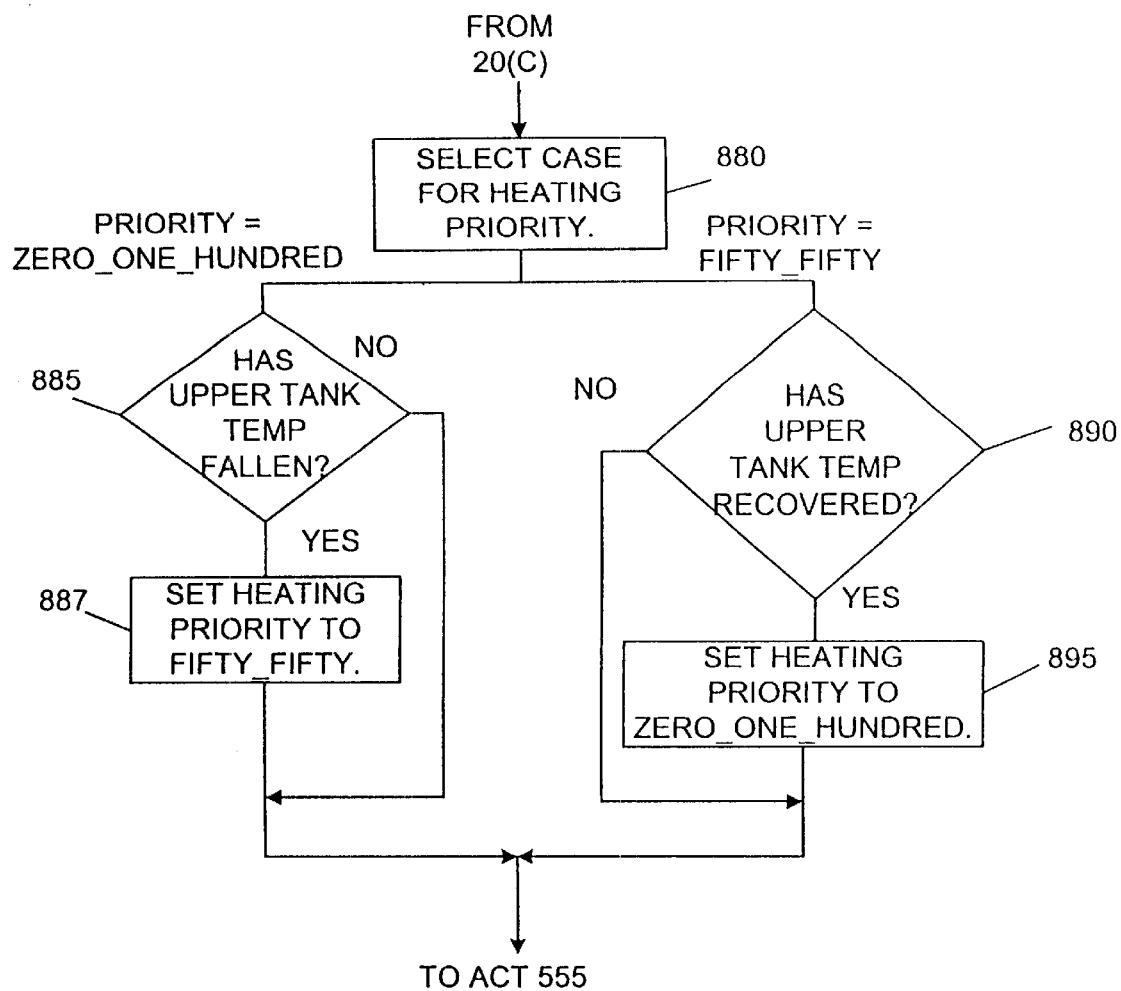

At act 800 (see FIG. 20(c)), the software determines whether a temperature slope calculation period has elapsed. If the period has elapsed, then the software resets the timer and computes a temperature slope (act 805). Computing the temperature slope allows the determination of whether a water draw is occurring. At regular intervals (e.g., 90 seconds), the most recent temperature sample of the tank is compared with previous samples stored in the memory unit (315). Based on the temperature values, a temperature slope or rate of change of temperature is calculated for the water. If the user is drawing water, a large negative slope value will result informing the software that a draw of water is in progress.

At act 810, the software sets a duty cycle that determines the amount of power to be transferred to each heating element. The amount of power varies depending on the temperature of the water and the water heater code for the water heater 200. In addition, the amount of power may take into account a water heater usage pattern (which is stored in the memory unit 315), the ambient temperature, a water consistency value, or other information.

For act 810, the software obtains from the memory unit 315 the water heater code and past records of data stored by the water heater. The past records are stored each time the software completes act 555 (FIG. 18), and each record includes the time of day, duration of past heatings, rate of change (slope) in water temperature decline and rise, and may additionally include other information such as ambient room temperature. As the controller 260 heats the water, it looks into the memory unit 315 for recorded information of similar circumstances during the same time period in previous days and/or weeks. If it appears that the user is using about the same amount of water during any given period then the water will be heated at a standard rate for the water heater code that will satisfy the anticipated consumption rate of heated water. If the stored data would indicate that there may be no further usage after the present heating cycle, the water then will be heated very slowly at a lower duty cycle to minimize energy consumption. If there is an abrupt and rapid decline (i.e., negative temperature slope) in water temperature, the software will calculate a new duty cycle according to the present usage condition of the water heater. As usage patterns change the old records will be modified to reflect the current operating conditions. For the preferred embodiment, the base line formula in considering what minimum water temperature flow rates will be acceptable is a minimum recovery equal to ten gallons per hour at sixty degree Fahrenheit temperature rise.

With this formula, product code information and usage records, the power input ratios versus temperature rate change are used in determining heating strategies. The strategies provide input power levels to meet or exceed the minimum recovery rate, while keeping energy efficiency to a maximum. As conditions change in usage patterns the strategy is modified to maintain the minimum recovery standard.

For example, a standard heating strategy for a first water heater code having a first element wattage will differ when compared to a heating strategy for a second water heater code having a second element wattage. Two exemplary heating strategies for the second element 240 are shown in Tables 1 and 2.

TABLE 1

Water Heating Strategy for a First Heater Code

| Water Temperature | Power or Duty Cycle of the Second Element |
|---|---|
| <115° F. | 100% |
| 115° F. to 120° F. | 66% |
| 120° F. to 125° F. | 57% |
| 125° F. to 130° F. | 50% |
| 130° F. to 135° F. | 40% |
| 135° F.> | 20% |

TABLE 2

Water Heating Strategy for a Second Heater Code

| Water Temperature | Power or Duty Cycle of the Second Element |
|---|---|
| <115° F. | 100% |
| 115° F. to 120° F. | 80% |
| 120° F. to 125° F. | 66% |
| 125° F. to 130° F. | 50% |
| 130° F. to 135° F. | 40% |
| 135° F.> | 20% |

For water heater 200, the duty cycle or power applied to the heating elements 235 or 240 is based at least in part on the sensed water temperature and the water heater code. The concept of a heating strategy dependent on a water heater code is unlike the method of heating water for water heaters 10 and 150. For water heaters 10 and 150, the duty cycle or power applied to the heating elements 16 and/or 16' is based on the difference between the sensed water temperature and the desired water temperature. However, it has been determined that increasing the power to an element submerged in water at a given water temperature may not result in an optimum water temperature gain when compared to the power input. For example, assuming all other conditions are the same, it has been determined that more heat can be transferred from an element to water when the water is at a cooler temperature. As the water temperature increases, less power needs to be provided to the heating element 235 or 240 regardless of the difference between the sensed temperature and the desired temperature (i.e., the excess power will not result in an optimum transfer when compared to the power input). Therefore, the software does not need to take into account the difference between the desired temperature and the sensed temperature for heating the water. But it is envisioned that under some circumstances (e.g., the usage pattern changes resulting in the water needing to be heated as fast as possible without a concern for efficiency) that a heating strategy may want to include a difference measurement.

At act 815, the software determines the "draw down" state. The draw down state indicates whether a user is currently drawing water and at what rate the user is drawing the water. The draw down state has four values: "tank is heating", "draw-down-one", "draw-down-two", and "recovering". If the draw down state is "tank-is-heating", then the software proceeds to act 820. If the draw down state is "draw-down-one", then the software proceeds to act 825. If the draw down state is "recovering", then the software proceeds to act 830. If the draw down state is "draw-down-two", then the software proceeds to act 835.

At act 820, the software determines whether the temperature slope is less than or equal to a threshold for a draw down. For example, if the calculated temperature slope is less than ten degrees Fahrenheit then the software determines a draw down is in progress and sets the draw down state to "draw-down-one" (act 840). If the temperature slope is greater than the draw down threshold then the software determines a draw is not in progress and proceeds to act 870.

If the draw down state is currently "draw-down-one", then the water heater had previously been in a draw down (i.e., a user is using hot water). At act 825, the software determines whether the temperature slope is positive. If the temperature slope is positive, then the software determines that the water heater is recovering and sets the draw down state to recovering (act 845). If the temperature slope is still negative, then the software determines the water heater is still in a draw down and proceeds to act 870.

If the draw down state is currently set to "recovering", then the water heater is recovering from a draw down. At act 830, the software determines whether there has been another draw down (i.e., the temperature slope is less than or equal to the threshold for a draw down). If there was another draw down, then the software sets the draw down state to "draw-down-two"(act 850). If the software determines the water heater is still recovering, the program proceeds to act 870.

At act 835, the software determines whether the lower tank temperature is greater than or equal to a heater-on temperature. If the lower tank temperature is greater than or equal to a heater-on temperature, then the software sets the draw down state to recovering and resets the temperature slope. If the lower tank temperature is less than the heater-on temperature, then the microcontroller U1 sets the duty cycle to fall power (act 760). Of course, other duty cycles can be used depending upon the particular water heater and environmental circumstances.

At act 870, the software determines the heating priority for the water heater. If the heating priority is "fifty-fifty" (discussed below), then the software sets the duty cycle to fall power (act 875) regardless of the water temperature. Of course, other duty cycles can be used depending upon the particular water heater and environmental circumstances. If the heating priority is not in the fifty-fifty mode, then the software proceeds to act 880 (FIG. 20(*d*)).

At act 880, the software selects a case based on the previously determined heating priority. The heating priority is used for determining which elements are active. For example, if the first element is an upper element and the second element is a lower element (similar to FIG. 5), then under certain conditions both elements may be used. For this arrangement, if both elements are being used, then the heating priority will be fifty-fifty. If only one element is used, then the heating priority is zero-one-hundred. Alternatively, if the elements are in a substantially horizontal plane, both elements may be used in a fifty-fifty arrangement (vs. only one element being used) to heat the water.

At act 885, the software determines if the upper tank temperature has fallen (i.e. the temperature slope of the upper element is less than or equal to a threshold). If the upper tank temperature has fallen, then the software sets the heating priority to "fifty-fifty" (act 887), resulting in both elements heating the water. If the upper tank temperature has not fallen, then the software proceeds to act 555 (FIG. 16).

At act 890, the software determines whether the upper tank temperature has recovered (i.e., the temperature slope of the upper element is greater than a threshold). If the upper temperature tank has recovered, then the software sets the priority to "zero-one-hundred" (act 895), resulting in only the second element 240 heating the water. If the upper tank temperature has not recovered, then the software proceeds to act 555 (FIG. 16).

Figure 21:
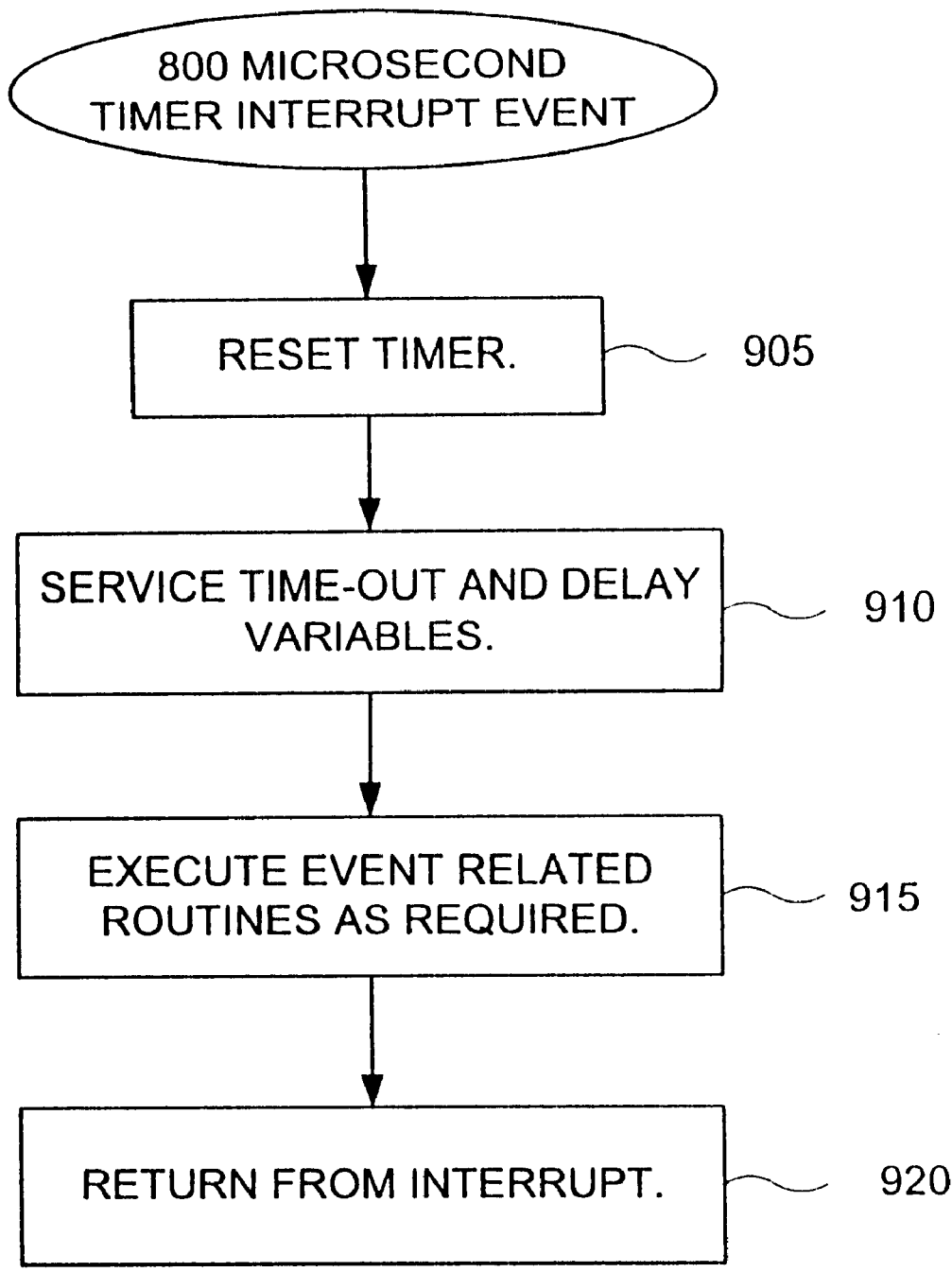
FIG. 21 is a flowchart representing an eight hundred microsecond interrupt event.

Every eight hundred microseconds, the software performs a timer interrupt event. The timer interrupt is used as a time base for various timeouts (e.g., the "ReCheck" timeout). During each interrupt, the microcontroller's timer is reset and the timeout variables are decreased if their value is still greater than zero. Once a timeout value reaches zero, the associated routine can be performed at that time, or can be performed during the main loop. As shown in FIG. 21, at act 905, the software resets the timer for the next scheduled interrupt. At act 910, the software services timeouts (i.e., decrease each timeout) and delays variables. At act 915, the software executes event-related routines as required. At act 920, the software returns from the interrupt to the act it was previously implementing.

Every time the signal (AcOutHI) crosses zero volts, the micro controller U1 performs a zero crossing event interrupt. When transistor Q8 (FIG. 12) turns on, it goes into saturation causing a falling edge that generates an interrupt to the microcontroller U1. The falling edge is used as a reference edge for activating triacs Q1 and Q2 (FIG. 16(*b*)). When the reference edge occurs, the timer interrupt (FIG. 21) is adjusted so that it will correspond exactly to when a zero crossing occurs. In this way, the zero crossing interrupt fires the triacs at precisely the right time.

To control the power transmitted to the heating elements 235 and 240, the microcontroller U1 generates an output signal (first-element or second-element) which is provided to the zero-cross triac drivers U5 and U6, respectively. The zero-cross triac drivers US and U6 in combination with triacs Q1 and Q2 control the high-voltage AC signal (AcIn) being provided to the heating elements 235 and 240.

For controlling the power transmitted to the heating elements 235 and 240, triac Q1 or Q2 is fired for a sequence of four sequential half AC cycles. The triac Q1 or Q2 fired is based on the heating priority and the status at the software relative to the heating cycle. For example, if the heating priority is "zero-one-hundred", then only one triac Q2 will be fired. Alternatively, if the heating priority is "fifty-fifty" and the heating elements 235 and 240 are being fired sequentially, then the software includes a variable specifying which heating element 235 or 240 is being activated. After firing a sequence of four sequential AC half cycles, the software delays firing, i.e. does not fire the triac Q1 or Q2 for a number of cycles. The number of cycles the triac Q1 or Q2 does not fire is determined by the amount of power to be transmitted to the heating elements 235 or 240. For example, if 100% power is to be transmitted, then the software will not delay the firing at all. If 50% power is to be transmitted, then the software will delay the firing of the triac Q1 or Q2 for four half AC cycles. Table 3 discloses an exemplary power transfer table.

TABLE 3

Lookup Table for Various Duty Cycles based on an Initial Four Cycle Firing

| Delay (half-cycle) | Power Transfer |
| --- | --- |
| 0 half cycle delay | 100% Power |
| 1 half cycle delay | 80% Power |
| 2 half cycle delay | 66% Power |
| 3 half cycle delay | 57% Power |

TABLE 3-continued

Lookup Table for Various Duty Cycles based on an Initial Four Cycle Firing

| Delay (half-cycle) | Power Transfer |
|---|---|
| 4 half cycle delay | 50% Power |
| 6 half cycle delay | 40% Power |
| 16 half cycle delay | 20% Power |

Of course, other half cycle delays can be used and the initial four cycle firing can vary to obtain different power transfer ratios.

While particular embodiments of the invention have been shown and described herein, changes and modifications may be made without departing from the spirit and scope of the invention. For example, logic chips other than the Motorola UAA1016A logic chip may be used to control the on-off cycle of thyristor 103. Also, a temperature sensing device other than the thermistor used as temperature sensing device 102 may be employed. Also, a thyristor other than a Motorola TRIAC may be used as thyristor 103 and multiple heating elements and other alternative control circuits, as noted above, may be utilized. Therefore, no limitation of the invention is intended other than limitations contained in the appended claims.

Various other features and advantages of the invention are set forth in the following claims.

What is claimed is:

1. A water heater comprising:
   a tank for holding water;
   a water inlet line having an inlet opening that introduces cold water to the tank;
   a water outlet line having an outlet opening that withdraws heated water from the tank;
   a first heating element extending into the tank;
   a second heating element extending into the tank;
   a control circuit operable to control the supply of electric power to the first and second heating elements in bursts, respectively, each burst followed by a period during which electric power is not supplied to the heating elements, the control circuit further operable to activate the first heating element for a first period of time and to activate the second heating element for a second period of time; and
   wherein the tank has a longitudinal axis, wherein the tank has a plane substantially orthogonal to the longitudinal axis, and wherein the first and second heating elements are positioned within the substantially orthogonal plane.

2. A water heater as in claim 1, wherein the tank defines a volume having an upper two-thirds volume and a lower one-third volume, wherein the outlet opening is disposed within the upper two-thirds volume and the inlet opening is disposed within the lower one-third volume, and wherein the first and second heating elements extend into the lower one-third volume.

3. A water heater as in claim 2, wherein the first and second heating elements are activated in a sequential manner.

4. A water heater as in claim 1, wherein the first and second heating elements are activated in a sequential manner.

5. A water heater as in claim 1, wherein the tank has a top and a bottom, wherein the water inlet line includes a dip tube extending into the tank at a point adjacent the top of the tank, and wherein the inlet opening is adjacent the bottom of the tank.

6. A water heater as in claim 5, wherein the dip tube includes a valve positioned in the dip tube, wherein the valve has a conduit and is controlled by the control circuit to introduce cold water into the water tank through the conduit.

7. A water heater comprising:
   a tank for holding water, the tank defining a volume having an upper two-thirds volume and a lower one-third volume;
   an inlet line having an inlet opening disposed within the lower one-third volume, the inlet opening adds cold water to the tank;
   an outlet line having an outlet opening disposed within the upper two-thirds volume, the outlet opening withdraws heated water from the tank;
   first and second heating elements extending into the lower one-third volume;
   a control circuit operable to control the supply of electric power to the first and second heating elements in bursts, each burst followed by a period during which electric power is not supplied to the heating elements, the control circuit further operable to activate the first heating element for a first period of time and to activate the second heating element for a second period of time.

8. A water heater as in claim 7, wherein the second heating element and the first heating element are activated in a sequential matter.

9. A water heater as in claim 8, wherein the tank has a longitudinal axis, wherein the tank has a plane substantially orthogonal to the longitudinal axis, and wherein the first and second heating elements are positioned in the substantially orthogonal plane.

10. A water heater as in claim 7, wherein the tank has a top and a bottom, and wherein the water inlet line includes a dip tube extending into the tank at a point adjacent the top of the tank.

11. A water heater as in claim 10, wherein the dip tube includes a valve positioned in the dip tube, wherein the valve has a conduit and is controlled by the control circuit to introduce cold water into the water tank through the conduit.

* * * * *

UNITED STATES PATENT AND TRADEMARK OFFICE
CERTIFICATE OF CORRECTION

PATENT NO. : 6,363,216 B1
DATED : March 26, 2002
INVENTOR(S) : Kenneth A. Bradenbaugh It is certified that error appears in the above-identified patent and that said Letters Patent is hereby corrected as shown below:

Title page,
Item [56], References Cited, U.S. PATENT DOCUMENTS, insert the following:

| | | |
|---|---|---|
| -- 1,555,338, | Vaughan, | 09/29/1925 |
| 2,312,772, | Osterheld, | 03/02/1943 |
| 3,352,999, | Macoicz, et al., | 11/14/1967 |
| 3,446,939, | Morgan, et al., | 05/27/1969 |
| 3,502,843, | Stryer, | 03/24/1970 |
| 3,586,830, | Leitner, et al., | 06/22/1971 |
| 3,637,984, | Irvine, | 01/25/1972 |
| 3,992,607, | Jolin, | 11/16/1976 |
| 4,039,928, | Noftsker, et al., | 08/02/1977 |
| 4,046,991, | Sefton, et al., | 09/05/1977 |
| 4,053,733, | Murata, et al., | 10/11/1977 |
| 4,088,871, | Coulmance, et al., | 05/09/1978 |
| 4,111,443, | Sullivan, | 09/05/1978 |
| 4,166,944, | Scott, | 09/04/1979 |
| 4,167,663, | Granzow, Jr., et al., | 09/11/1979 |
| 4,223,207, | Chow, | 09/16/1980 |
| 4,225,777, | Schindler, | 09/30/1980 |
| 4,337,388, | July, | 06/29/1982 |
| 4,362,924, | Story, et al., | 12/07/1982 |
| 4,449,032, | Frerking, | 05/15/1984 |
| 4,467,183, | Ishima, | 08/21/1984 |
| 4,467,178, | Swindle, | 08/21/1984 |
| 4,467,182, | Merkel, | 08/21/1984 |
| 4,495,402, | Burdick, et al., | 01/22/1985 |
| 4,620,667, | VanderMeyden, et al., | 11/04/1986 |
| 4,777,350, | Crockett, et al., | 10/11/1988 |
| 4,832,259, | VanderMeyden, | 05/23/1989 |
| 4,834,284, | VanderMeyden, | 05/30/1989 |
| 4,845,342, | Chen, | 07/04/1989 |
| 4,859,834, | Hausler, et al., | 08/22/1989 |
| 4,894,520, | Moran, | 01/16/1990 |
| 4,900,900, | Shirae, et al., | 02/13/1990 |
| 4,906,820, | Haarmann, et al., | 03/06/1990 |
| 4,950,872, | Chen, | 08/21/1990 |

UNITED STATES PATENT AND TRADEMARK OFFICE
CERTIFICATE OF CORRECTION

PATENT NO.   : 6,363,216 B1
DATED        : March 26, 2002
INVENTOR(S)  : Kenneth A. Bradenbaugh It is certified that error appears in the above-identified patent and that said Letters Patent is hereby corrected as shown below:

| | | |
|---|---|---|
| 4,978,838, | Sanjuan, | 12/18/1990 |
| 5,006,695, | Elliott, | 04/09/1991 |
| 5,019,690, | Knepler, | 05/28/1991 |
| 5,025,134, | Bensoussan, et al., | 06/18/1991 |
| 5,079,784, | Rist, et al., | 01/14/1992 |
| 5,090,305, | Lehman, | 02/25/1992 |
| 5,103,078, | Boykin, et al., | 04/07/1992 |
| 5,168,545, | Hart, | 12/01/1992 |
| 5,293,446, | Owens, et al., | 03/08/1994 |
| 5,305,418, | Tuttle, | 04/19/1994 |
| 5,367,602, | Stewart, | 11/22/1994 |
| 5,582,755, | Maher, Jr., et al., | 12/10/1996 |
| 5,588,088, | Flaman, | 12/24/1996 |
| 5,626,287, | Krause, et al., | 05/06/1997 |
| 5,660,328, | Momber, | 08/26/1997 |
| 5,679,275, | Spraggins, et al., | 10/21/1997 |
| 5,831,250, | Bradenbaugh, | 11/03/1998 |
| 5,866,880, | Seitz, et al., | 02/02/1999 |
| 5,968,393, | Demaline, | 10/19/1999 |
| 6,002,114, | Lee, | 12/14/1999 |
| 6,242,720, | Wilson, et al., | 06/05/2001 |
| 6,265,699, | Scott, | 07/24/2001 -- |

Signed and Sealed this

Twenty-fourth Day of December, 2002

JAMES E. ROGAN
*Director of the United States Patent and Trademark Office*